(12) United States Patent
Uchida et al.

(10) Patent No.: US 12,129,888 B2
(45) Date of Patent: Oct. 29, 2024

(54) ROLLING BEARING HOLDER UNIT

(71) Applicant: MINEBEA MITSUMI Inc., Nagano (JP)

(72) Inventors: Yoji Uchida, Nagano (JP); Hideo Fujiura, Nagano (JP); Tatsuya Takimoto, Nagano (JP); Yoji Iguchi, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 92 days.

(21) Appl. No.: 18/005,742

(22) PCT Filed: Jul. 27, 2021

(86) PCT No.: PCT/JP2021/027788
§ 371 (c)(1),
(2) Date: Jan. 17, 2023

(87) PCT Pub. No.: WO2022/025076
PCT Pub. Date: Feb. 3, 2022

(65) Prior Publication Data
US 2023/0313838 A1  Oct. 5, 2023

(30) Foreign Application Priority Data
Jul. 31, 2020  (JP) .................. 2020-131006

(51) Int. Cl.
*F16C 19/52* (2006.01)
*F16C 19/16* (2006.01)
(Continued)

(52) U.S. Cl.
CPC .......... *F16C 19/522* (2013.01); *F16C 19/163* (2013.01); *F16C 35/073* (2013.01);
(Continued)

(58) Field of Classification Search
CPC .... F16C 19/163; F16C 19/183; F16C 19/184; F16C 19/522; F16C 35/06; F16C 35/061;
(Continued)

(56) References Cited

U.S. PATENT DOCUMENTS

| | | | |
|---|---|---|---|
| 5,140,849 A * | 8/1992 | Fujita | G01P 3/443 |
| | | | 73/862.541 |
| 6,920,801 B2 * | 7/2005 | Van Leeuwen | G01L 5/0019 |
| | | | 73/862.49 |

(Continued)

FOREIGN PATENT DOCUMENTS

| | | | | |
|---|---|---|---|---|
| DE | 4218949 A1 * | 12/1993 | ............ | F16C 19/522 |
| DE | 102009021469 A1 * | 11/2010 | .............. | F16C 19/52 |

(Continued)

OTHER PUBLICATIONS

International Search Report for PCT/JP2021/027788 mailed on Oct. 12, 2021.

*Primary Examiner* — Alan B Waits
(74) *Attorney, Agent, or Firm* — IPUSA, PLLC

(57) ABSTRACT

A rolling bearing holder unit disclosed herein includes: a rolling bearing with a predetermined rotation axis, the rolling bearing including: an outer ring; an inner ring placed inward relative to an inner circumferential surface of the outer ring to be coaxial with the outer ring; and a plurality of rolling bodies placed between the outer ring and the inner ring; a bearing holder placed in contact with an outer circumferential surface of the outer ring or an inner circumferential surface of the inner ring in the rolling bearing; and a strain gauge with a resistor that is configured to detect a strain of the outer ring or the inner ring. In this rolling bearing holder unit: the bearing holder has a thick part and a thin part that is thinner than the thick part; the strain gauge is placed on the thin part; the rolling bearing is preloaded to form a predetermined contact angle; and the thick part is (Continued)

placed in contact at least with a region extending from an intersection of a straight line indicating the predetermined contact angle and the outer circumferential surface of the outer ring or the inner circumferential surface of the inner ring, to a preloaded end surface, the preloaded end surface being an end surface of the outer ring or the inner ring located nearer to the intersection.

13 Claims, 21 Drawing Sheets

(51) Int. Cl.

| | | |
|---|---|---|
| *F16C 35/07* | (2006.01) | |
| *F16C 35/073* | (2006.01) | |
| *F16C 35/077* | (2006.01) | |
| *G01L 5/00* | (2006.01) | |
| *F16C 19/18* | (2006.01) | |

(52) U.S. Cl.
CPC .......... *F16C 35/077* (2013.01); *G01L 5/0019* (2013.01); *F16C 19/183* (2013.01); *F16C 19/184* (2013.01); *F16C 2233/00* (2013.01)

(58) Field of Classification Search
CPC .... F16C 35/063; F16C 35/067; F16C 35/073; F16C 35/077; F16C 2233/00; G01L 5/0009; G01L 5/0019
See application file for complete search history.

(56) References Cited

U.S. PATENT DOCUMENTS

| | | | |
|---|---|---|---|
| 11,181,443 B2 * | 11/2021 | Bachmann | ............ F16C 19/527 |
| 2002/0194927 A1 | 12/2002 | Yoshida et al. | |
| 2011/0209562 A1 | 9/2011 | Ono et al. | |
| 2020/0400517 A1 * | 12/2020 | Benoit | ................... H02K 5/225 |

FOREIGN PATENT DOCUMENTS

| | | | | |
|---|---|---|---|---|
| DE | 102017120756 A1 * | 3/2019 | | |
| DE | 102018131265 A1 * | 6/2020 | | |
| JP | 2004-061117 | 2/2004 | | |
| JP | 3766864 | 4/2006 | | |
| JP | 2007232222 A * | 9/2007 | ............. | F16C 19/52 |
| JP | 2010-127750 | 6/2010 | | |
| JP | 2010-144888 | 7/2010 | | |
| JP | 2012-149939 | 8/2012 | | |
| JP | 2020-008527 | 1/2020 | | |
| WO | WO-2015194609 A1 * | 12/2015 | | |

* cited by examiner

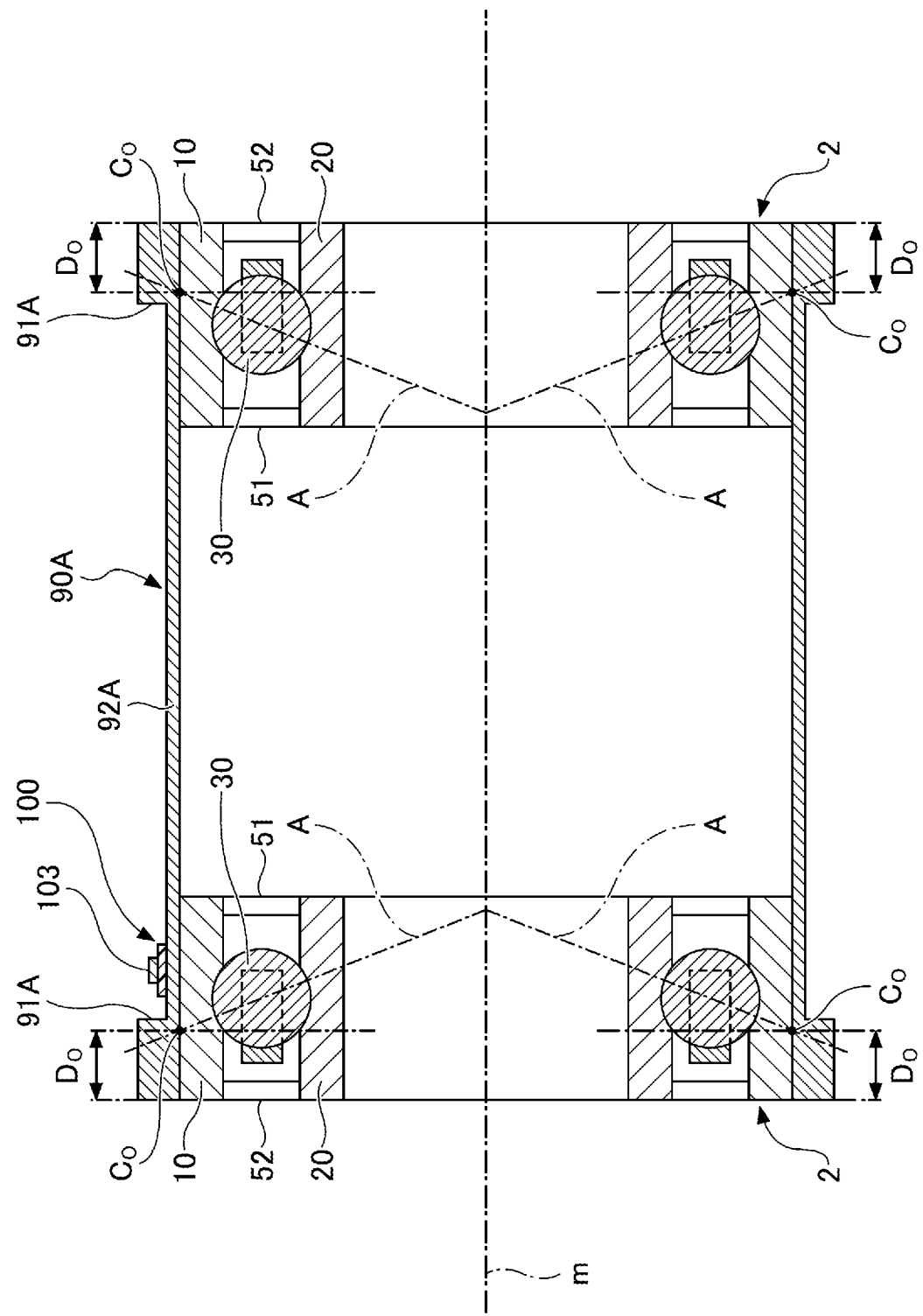

ROLLING BEARING HOLDER UNIT

TECHNICAL FIELD

The present invention relates to a rolling bearing holder unit.

BACKGROUND ART

There is a unit that is known to include: a rolling bearing with an outer ring having a track surface on the inner circumferential side, an inner ring having a track surface on the outer circumferential side, and a rolling body interposed between the track surface of the outer ring and the track surface of the inner ring bearing; and a strain gauge that detects the strain of the outer ring or the inner ring. For example, there is a structure, in which a rolling bearing is provided with a double cylindrical bearing member, and in which a strain gauge is placed in this bearing member (see Patent Document 1, for example).

CITATION LIST

Patent Document

Patent Document 1: Japanese Patent No. 3766864

SUMMARY OF THE INVENTION

Problem to be Solved by the Invention

However, assuming that there is a rolling bearing holder unit in which a rolling bearing is provided with a bearing holder and a strain gauge is placed in the bearing holder, depending on the structure of the portion of the bearing holder where the strain gauge is placed, it may be difficult to ensure the rigidity of the shaft to be inserted in the rolling bearing holder unit.

The present invention has been made in view of the above, and therefore an object of the present invention is to provide a rolling bearing holder unit that can reduce the decrease in the rigidity of the shaft due to the structure of the portion where the strain gauge is placed.

Means for Solving the Problem

A rolling bearing holder unit disclosed herein includes: a rolling bearing with a predetermined rotation axis, the rolling bearing including: an outer ring; an inner ring placed inward relative to an inner circumferential surface of the outer ring to be coaxial with the outer ring; and a plurality of rolling bodies placed between the outer ring and the inner ring; a bearing holder placed in contact with an outer circumferential surface of the outer ring or an inner circumferential surface of the inner ring in the rolling bearing; and a strain gauge with a resistor that is configured to detect a strain of the outer ring or the inner ring. In this rolling bearing holder unit: the bearing holder has a thick part and a thin part that is thinner than the thick part; the strain gauge is placed on the thin part; the rolling bearing is preloaded to form a predetermined contact angle; and the thick part is placed in contact at least with a region extending from an intersection of a straight line indicating the predetermined contact angle and the outer circumferential surface of the outer ring or the inner circumferential surface of the inner ring, to a preloaded end surface, the preloaded end surface being an end surface of the outer ring or the inner ring located nearer to the intersection.

Advantageous Effects of the Invention

According to the technique disclosed herein, it is possible to provide a rolling bearing holder unit that can reduce the decrease in the rigidity of the shaft due to the structure of the portion where the strain gauge is placed.

BRIEF DESCRIPTION OF THE DRAWINGS

FIG. 21 is a cross-sectional view that shows an example of the rolling bearing holder unit according to the fourth embodiment (pattern 2).

EMBODIMENTS FOR CARRYING OUT THE INVENTION

Figure 1:
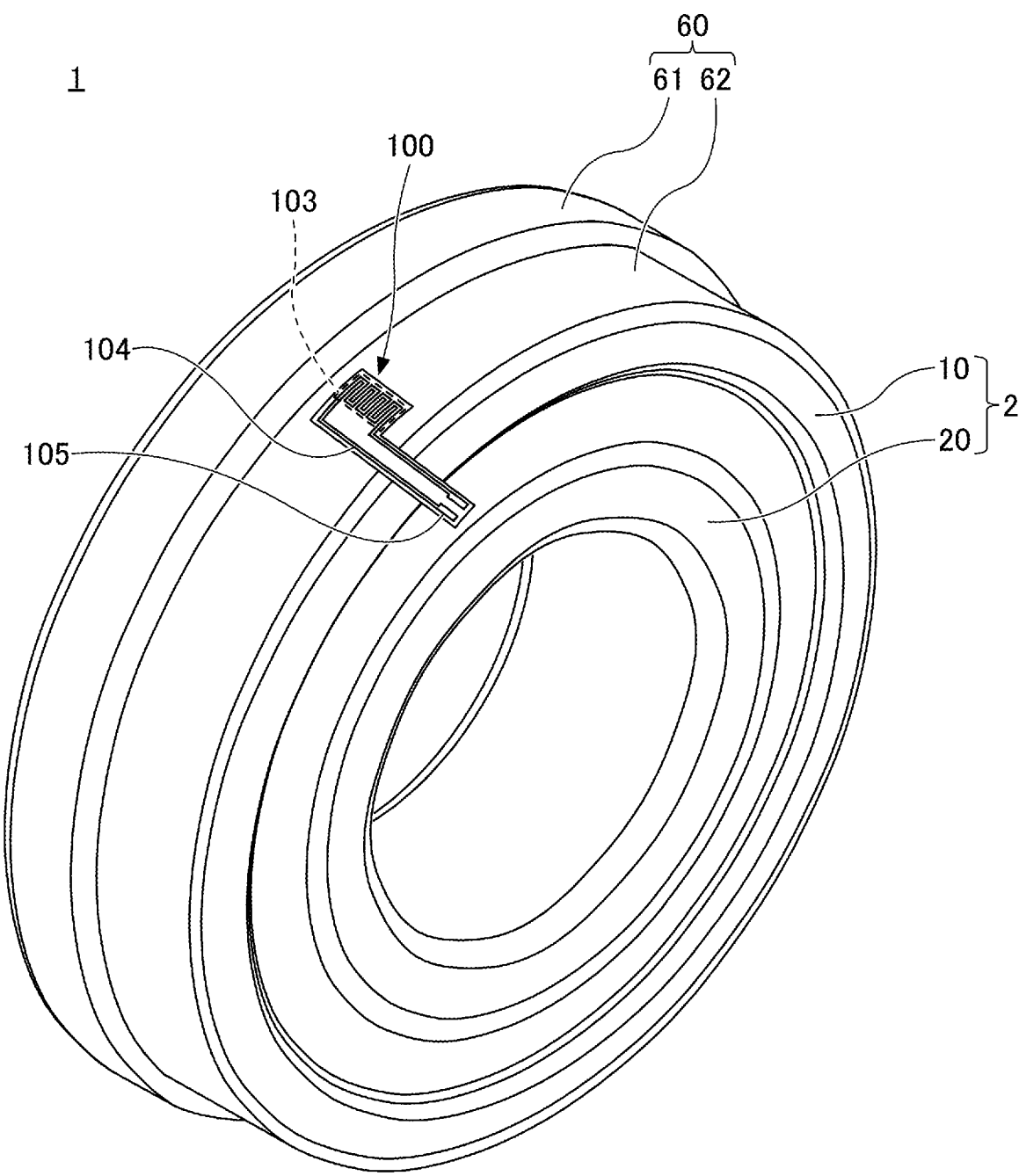
FIG. 1 is a perspective view that shows an example of a rolling bearing holder unit according to a first embodiment.

Hereinafter, embodiments for carrying out the invention will be described with reference to the accompanying drawings. In each drawing, the same components will be assigned the same reference numerals, and redundant description may be omitted.

First Embodiment

Figure 2:
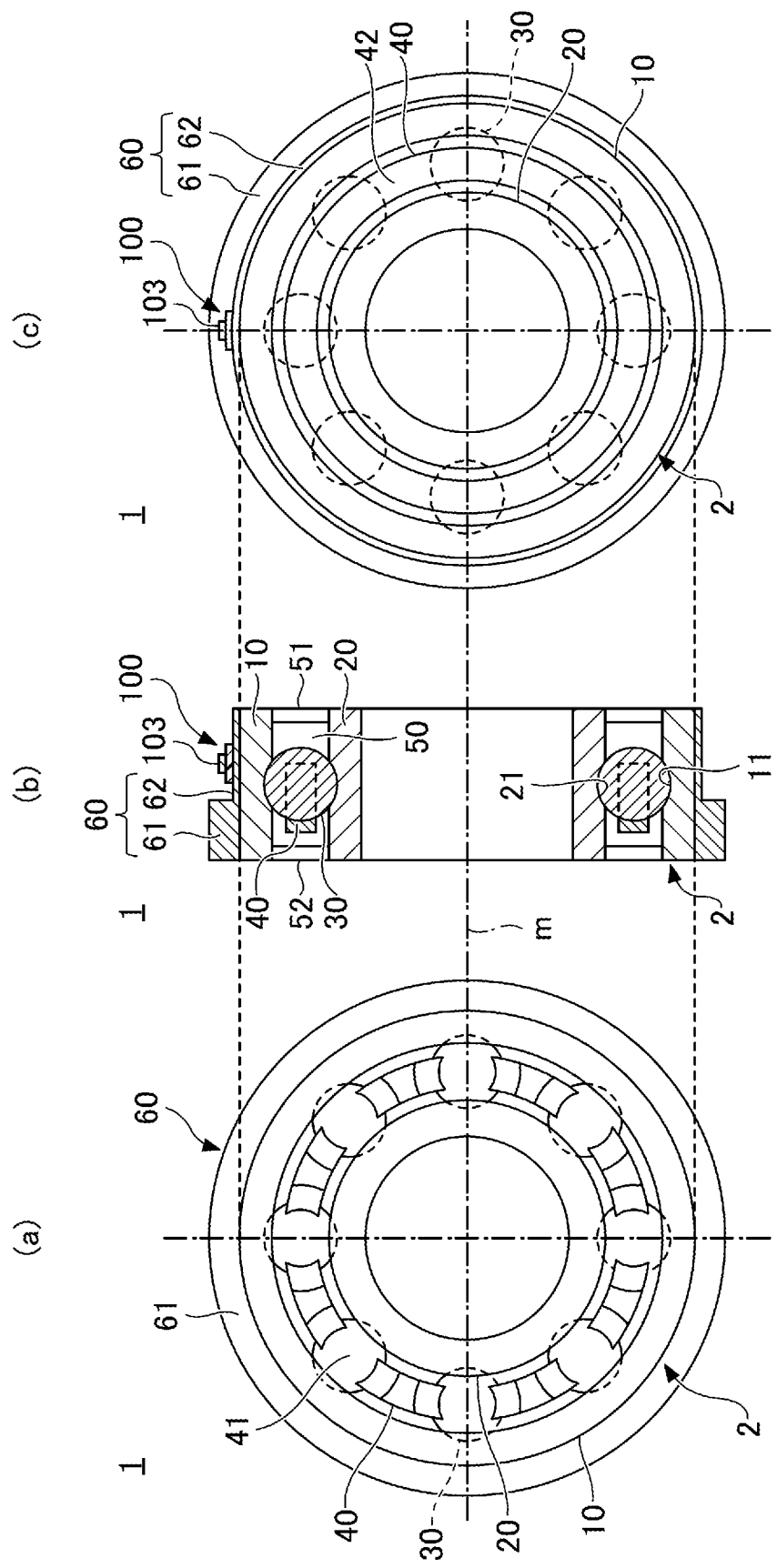
FIG. 2 is a diagram that shows examples of the rolling bearing holder unit according to the first embodiment.

FIG. 1 is a perspective view that shows an example of a rolling bearing holder unit according to the first embodiment. FIG. 2 is a diagram that shows examples of the rolling bearing holder unit according to the first embodiment, where FIG. 2(a) is a front view, FIG. 2(b) is a cross-sectional view, and FIG. 2(c) is a rear view.

Referring to FIG. 1 and FIG. 2, the rolling bearing holder unit 1 has a rolling bearing 2, a bearing holder 60, and a strain gauge 100. The rolling bearing 2 has an outer ring 10, an inner ring 20, a plurality of rolling bodies 30, a holder 40, and seals 51 and 52. Note that, in FIG. 2(a) and FIG. 2(c), illustration of the seals 51 and 52 is omitted for ease of explanation.

The outer ring 10 is a cylindrical structure, whose center axis is the rotation axis m. The inner ring 20 is a cylindrical structure that is placed on the inner circumferential side of the outer ring 10 to be coaxial with the outer ring 10. Each of the multiple rolling bodies 30 is a sphere that is placed in a track 50 formed between the outer ring 10 and the inner ring 20. A lubricant (not shown) such as grease is enclosed in the track 50. The seals 51 and 52 protrude from the inner circumferential surface of the outer ring 10, toward the inner ring 20, and thus isolate the track 50 from the outside.

In the inner circumferential surface of the outer ring 10, a recessed part 11 having a curved cross-section is formed in the circumferential direction of the outer ring 10. Also, in the outer circumferential surface of the inner ring 20, a recessed part 21 having a curved cross-section is formed in the circumferential direction of the inner ring 20. The rolling bodies 30 are guided circumferentially by the recessed parts 11 and 21.

The holder 40 is placed in the track 50 to hold the rolling bodies 30. To be more specific, the holder 40 is an annular body that is coaxial with the rotation axis m. On one side of the holder 40 in the direction of the rotation axis m, recessed parts 41 for accommodating the rolling bodies 30 are formed, and the other side of the holder 40 is a back part 42, which has a continuous shape in the circumferential direction of the annular body.

The bearing holder 60 is placed in contact with the outer circumferential surface of the outer ring 10, and presses the outer circumferential surface of the outer ring 10 over the entire circumference. Here, being in contact with the outer circumferential surface of the outer ring 10 means that the bearing holder 60 is in direct contact with the outer circumferential surface of the outer ring 10 without any other member in between, but this may also include, for example, the case in which the bearing holder 60 is in indirect contact with the outer circumferential surface of the outer ring 10 via another member such as an adhesive. The bearing holder 60 is press-fitted into the outer ring 10, for example. Alternatively, the bearing holder 60 may be bonded to the outer ring 10. The bearing holder 60 can be made of, for example, metals such as brass, aluminum, and stainless steel, resins, and so forth.

The bearing holder 60 includes a cylindrical (hollow and columnar) thick part 61, and a cylindrical thin part 62 that is thinner in the radial direction than the thick part 61. The length of the bearing holder 60 in the direction of the rotation axis m is substantially equal to the length of the outer ring 10 and the inner ring 20 in the direction of the rotation axis m. The length of each of the thick part 61 and the thin part 62 in the direction of the rotation axis m is shorter than the length of the outer ring 10 and the inner ring 20 in the direction of the rotation axis m. The thick part 61 and the thin part 62 have an inner diameter that is substantially equal to the outer diameter of the outer ring 10, and are adjacent to each other in the direction of the rotation axis m. The thick part 61 and the thin part 62 are molded integrally, for example.

In this embodiment, the respective thicknesses of the thick part 61 and the thin part 62 are substantially constant. The thin part 62 is a strain-transmitting part that transmits the strain generated in the outer ring 10 when the rolling body rotates, to the strain gauge 100. The strain gauge 100 is placed on the thin part 62 via an adhesive layer.

The strain gauge 100 is a sensor for detecting the strain of the outer ring 10 or the inner ring 20, and includes a resistor 103, wires 104, terminal parts 105, and so forth, which serve as a sensing part. The strain gauge 100 detects the changes in the resistance value of the resistor 103 as the strain of the outer ring 10 or the inner ring 20.

In the strain gauge 100, the resistor 103 is placed such that, for example, its longitudinal direction (gauge length direction) faces the circumferential direction of the outer ring 10. The outer ring 10 expands and contracts more easily in the circumferential direction than in the axial direction, so that, by placing the resistor 103 such that its longitudinal direction faces the circumferential direction of the outer ring 10, a large distortion waveform can be obtained. By monitoring the output of the strain gauge 100 with an external device, the strain generated in the outer ring 10 can be monitored.

Figure 3:
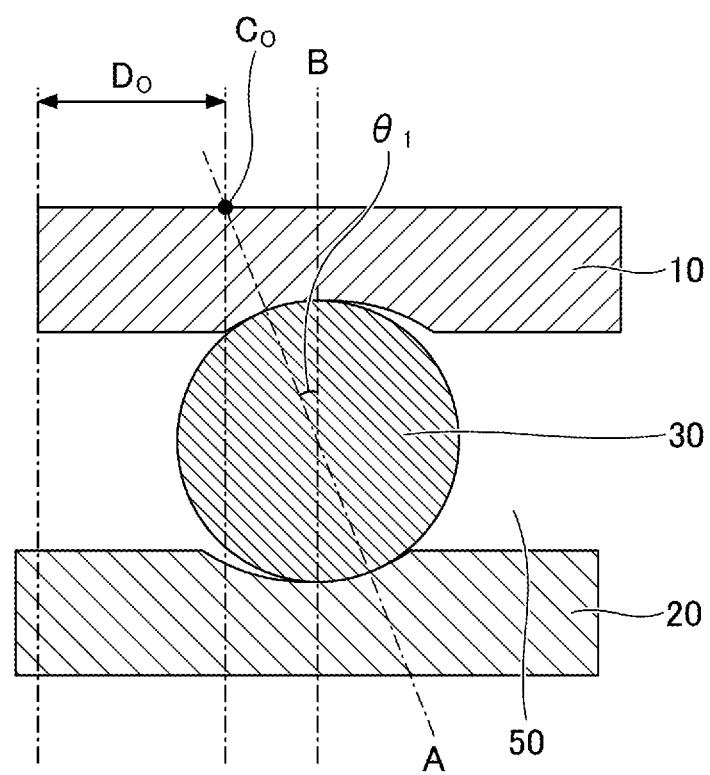
FIG. 3 is a diagram that explains a contact angle.

FIG. 3 is a diagram that explains the contact angle, and is a cross-sectional view to pass through the rotation axis m and the center of the rolling body 30. As shown in FIG. 3, a preload is applied to the outer ring 10 and the inner ring 20, so as to form a predetermined contact angle $\theta_1$. Applying an appropriate preload to the outer ring 10 and the inner ring 20 thus can contribute to improving the run-out accuracy of the rotation axis, reducing the vibration and noise, and so forth.

Here, in a cross-sectional view, the contact angle $\theta$ is the angle formed by: a straight line A that connects the contact point between the outer ring 10 and the rolling body 30 and the contact point between the inner ring 20 and the rolling body 30; and a straight line B that extends in the radial direction. In a cross-sectional view, $C_o$ is the intersection of the extension of the straight line A and the outer circumferential surface of the outer ring 10. In a cross-sectional view, $D_o$ is a region in the outer circumferential surface of the outer ring 10, stretching from the intersection point $C_o$ to the preloaded end surface of the outer ring 10, which is the end surface of the outer ring 10 nearer to the intersection point $C_o$. The region $D_o$ is a region where the displacement when the rolling body 30 rotates is relatively large. Note that the extension of the straight line A may be referred to as a "straight line indicating the contact angle."

Figure 4:
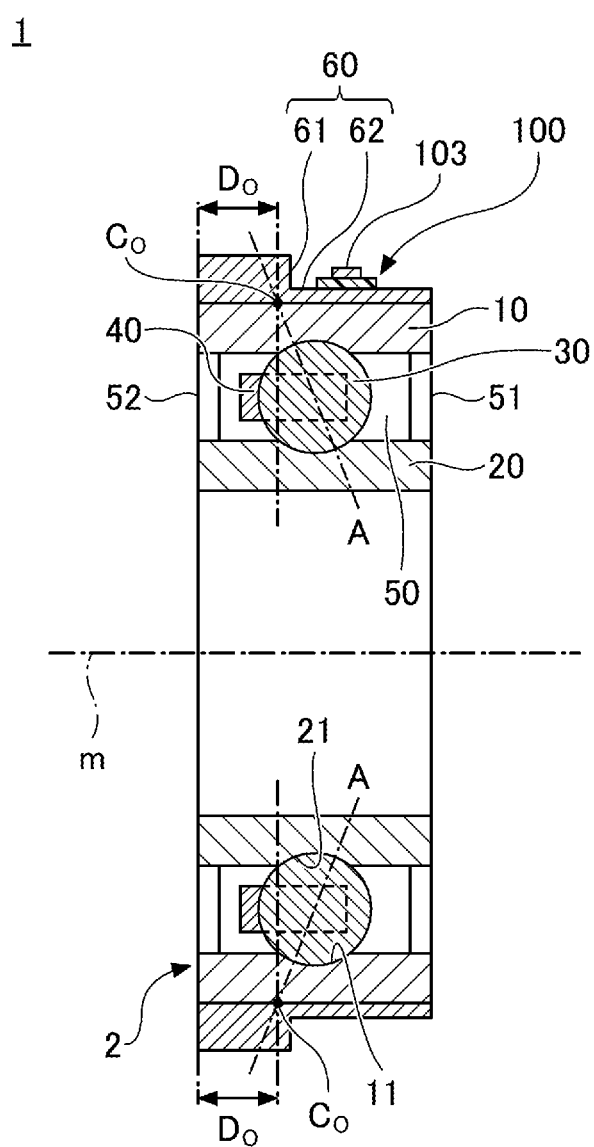
FIG. 4 is a diagram that explains a placement of a thick part of a bearing holder.

FIG. 4 is a diagram that explains a placement of the thick part of the bearing holder, and is a cross-sectional view that corresponds to FIG. 2(b). As shown in FIG. 4, the thick part 61 of the bearing holder 60 is placed in contact at least with the region $D_o$ of the outer circumferential surface of the outer ring 10. Thus, the thick part 61 of the bearing holder 60 is placed in contact with the region $D_o$, where the displacement when the rolling body 30 rotates is relatively large. As a result of this, it is possible to reduce the decrease in the rigidity of the shaft to be inserted in the rolling bearing holder unit 1 due to the structure of the portion where the strain gauge 100 is placed, thus ensuring the rigidity of the shaft.

By contrast with the above, the displacement during the rotation of the rolling body 30 is relatively small in the region of the outer circumferential surface of the outer ring 10 other than the region $D_o$, so that the thin part 62 of the bearing holder 60 can be placed in that region. Then, given the thinness of the thin part 62, the strain generated in the outer ring 10 when the rolling body 30 rotates can be transmitted appropriately to the strain gauge 100.

As for the thickness of the thin part 62, from the perspective of strain transmissibility, it is preferable to have an output that is approximately 10 times the noise component contained in the output voltage of the strain gauge 100. Consequently, in the event the strain gauge 100 constitutes one of the resistors of the Wheatstone bridge, and, for example, the thin part 62 has a cylindrical shape, then the thickness of the thin part 62 must be less than or equal to the thickness that satisfies following formula (1):

$$t = \sqrt{\frac{3\pi}{16} \frac{PL}{10eEnW} KV} \quad (1)$$

In formula (1): t is the thickness of the thin part 62; P is the load that is applied to the thin part 62; L is the inner diameter of the thin part 62; n is the number of rotations of the rolling bearing 2 per unit time; W is the length of the thin part 62 in the direction of the rotation axis m; K is the gauge factor; V is the bridge voltage; E is the Young's modulus of the thin part 62; and e is the noise voltage contained inside the output voltage $e_o$ of the strain gauge 100. However, when the inner ring is fixed, L is the outer diameter of the thin part.

Formula (1) can be derived as follows. That is, since the strain ε can be determined by designating the shape of the thin part 62 in a simulation based on the finite element method or the like, by introducing this strain ε in the following formula together with the parameters of the strain gauge, the output voltage $e_o$ can be roughly calculated. Then, the thickness t of the thin part 62 can be calculated backwards such that the output voltage $e_o$ is approximately 10 times the average of the noise output e.

To be more specific, the strain ε can be represented by a formula (2) using a bending moment M and a section modulus Z. Also, the bending moment M and the section modulus Z can be expressed by formulas (3) and (4), respectively. Also, assuming that the output voltage $e_o$ is 10 times the noise voltage e, the output voltage e, and the noise voltage e can be represented by a formula (5). Substituting formulas (2) to (4) into formula (5) yields a formula (6), and by bringing t of formula (6) to the left side and re-arranging, formula (1) is obtained.

$$\varepsilon = \frac{M}{EZ} \quad (2)$$

$$M = \frac{P\pi L}{4n} \frac{1}{2} \quad (3)$$

$$Z = \frac{2Wt}{3} \quad (4)$$

$$e_o = 10e = \frac{1}{4} K\varepsilon V \quad (5)$$

$$e = \frac{3\pi}{16} \frac{PL}{10Et^2 nW} KV \quad (6)$$

The above is an example of the calculation used when the thin part 62 is cylindrical. By changing the above formulas as appropriate according to the shape of the thin part 62, the required thickness of the thin part 62 can be calculated similarly.

For example, in the event the outer ring 10 is small in diameter (for example, approximately 30 mm in diameter), it is then preferable, from the perspective of ensuring the rigidity of the shaft to be inserted in the rolling bearing holder unit 1, to adjust the thickness of the thick part 61 such that the bending rigidity of the thick part 61 is 10 times or more that of the thin part 62. For example, if the thin part 62 has a cylindrical shape, the thickness of the thick part 61 is preferably approximately three times that of the thin part 62; in this case, the bending rigidity of the thick part 61 becomes approximately 10 times that of the thin part 62.

Note that it is preferable if the strain gauge 100 is placed in a location in the thin part 62 close to the thick part 61. This is because the deformation due to the transmission of load is greater nearer to the preload intersection point $C_o$. By this means, the thickness of the thin part 62 can be secured more reliably. Furthermore, by placing the end part of the strain gauge 100 that is on the thick part 61 side in contact with the end surface of the thick part 61 that is on the thin part 62 side, the strain gauge 100 can be positioned with ease.

For example, assume a case in which the outer ring 10 is small in diameter (for example, approximately 30 mm in diameter) and therefore it is difficult to place the strain gauge 100 in the outer ring 10. In this case, a bearing holder 60 having a thick part 61 and a thin part 62 may be placed on the outer circumferential side of the outer ring 10 of the rolling bearing 2, and the strain gauge 100 may be placed on the thin part 62. By this means, the strain gauge 100 can be placed with ease. The strain of the outer ring 10 is transmitted to the strain gauge 100 via the thin part 62, which is a strain-transmitting part, and can be detected by the strain gauge 100. In addition, by placing the thick part 61 of the bearing holder 60 in contact at least with the region $D_o$ of the outer circumferential surface of the outer ring 10, the rigidity of the shaft to be inserted in the rolling bearing holder unit 1 can be ensured. Also, by placing the bearing holder 60 on the outer circumferential side of the outer ring 10 of the rolling bearing 2, even if the rolling bearing 2 breaks down, the rolling bearing 2 can be replaced with ease, thus providing excellent maintainability.

Figure 5:
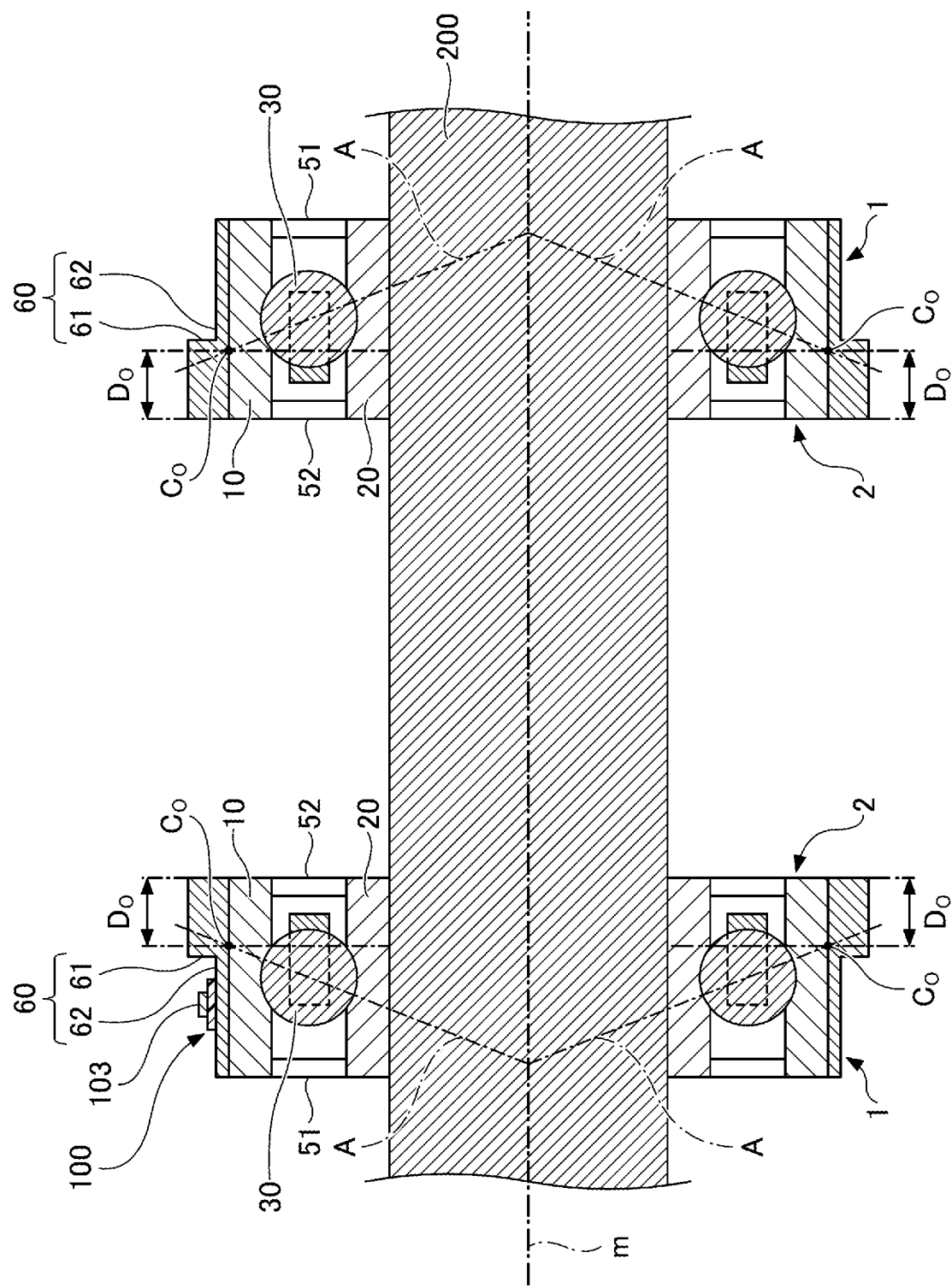
FIG. 5 is a diagram that explains how to use a rolling bearing holder unit 1 (pattern 1)

FIG. 5 is a diagram that explains how to use the rolling bearing holder unit 1 (pattern 1). As shown in FIG. 5, it is possible to place two rolling bearing holder units 1 a predetermined gap apart such that their respective rotation axes m match, and their respective preloaded end surfaces are opposite each other, and then insert a shaft 200. This is a double-back (DB) preloading direction, and, since the intersections of the straight lines A and the rotation axis m faces are oriented outward, the rigidity is high.

Figure 6:
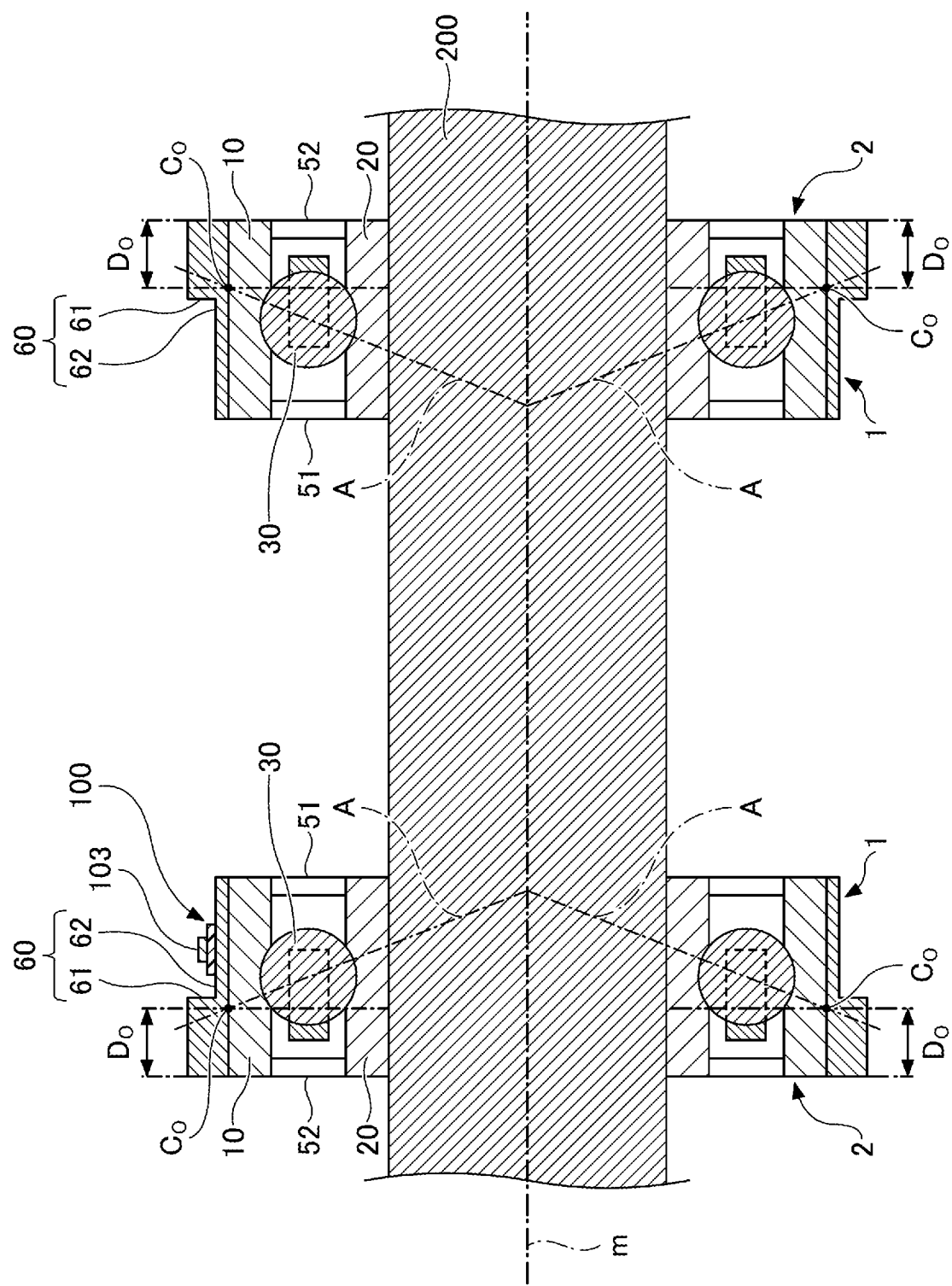
FIG. 6 is a diagram that explains how to use the rolling bearing holder unit 1 (pattern 2)

FIG. 6 is a diagram that explains how to use the rolling bearing holder unit 1 (pattern 2). As shown in FIG. 6, it is possible to place two rolling bearing holder units 1 a predetermined gap apart such that their respective rotation axes m match, and their respective preloaded end surfaces both face outward, and then insert the shaft 200. This is a double-front (DF) preloading direction, and since the intersections of the straight lines A and the rotation axis m are oriented inward, it is disadvantageous in terms of rigidity, but the tolerance for mounting errors increases. The method of use illustrated in FIG. 5 and the method of use illustrated in FIG. 6 can be selected as appropriate according to the application.

Figure 7:
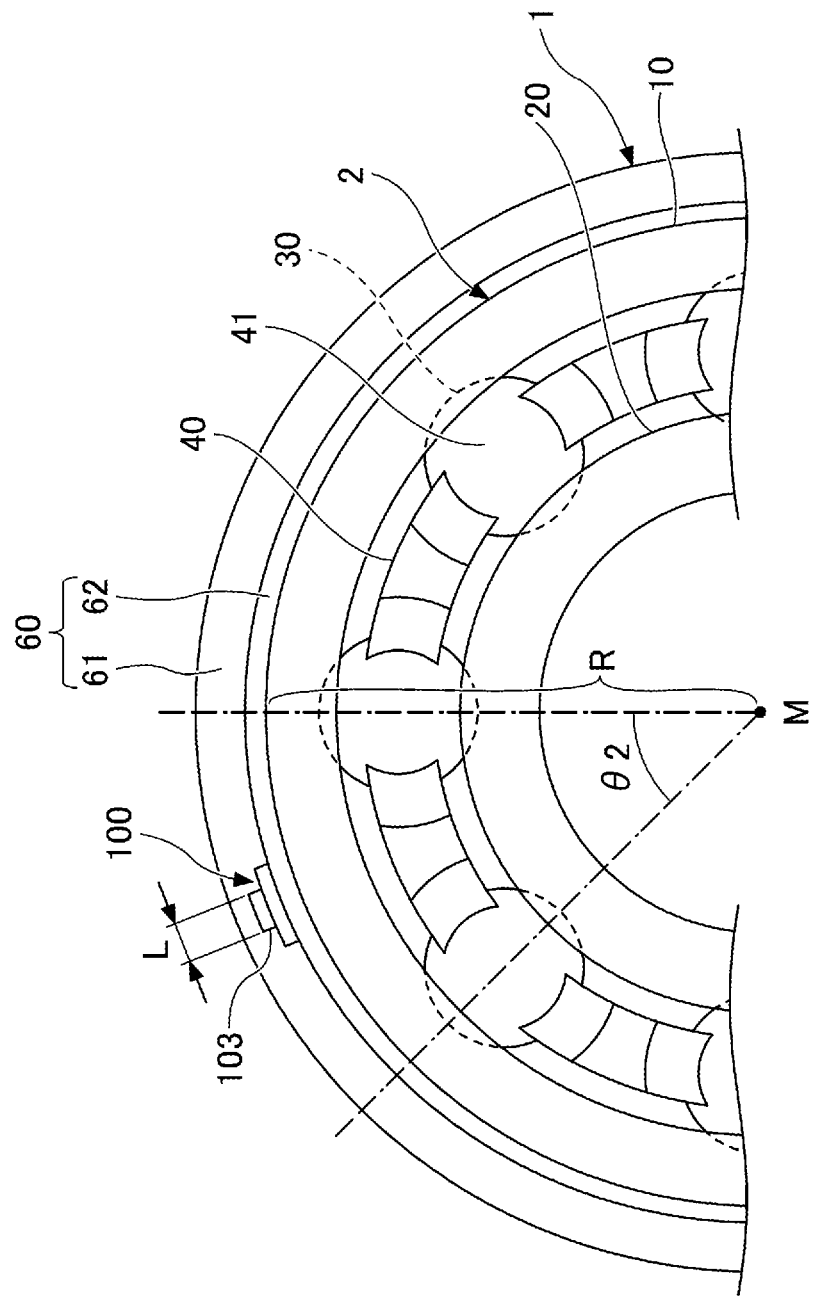
FIG. 7 is a diagram that explains the gauge length of a strain gauge.

FIG. 7 is a diagram that explains the gauge length of the strain gauge. In FIG. 7, $\theta_2$ is the angle formed by two straight lines that connect the rotation axis m and the centers of adjacent rolling bodies 30. Also, R is the inner diameter of the thin part 62 of the bearing holder 60. The gauge length L of the strain gauge is preferably smaller than the distance between adjacent rolling bodies 30 of the rolling bearing 2. That is, it is preferable if $\theta_2/360 \times 2\pi \times R > L$ holds. This makes it possible to detect the strain of the outer ring 10 caused by a single rolling body 30.

(Strain Gauge)

Figure 8:
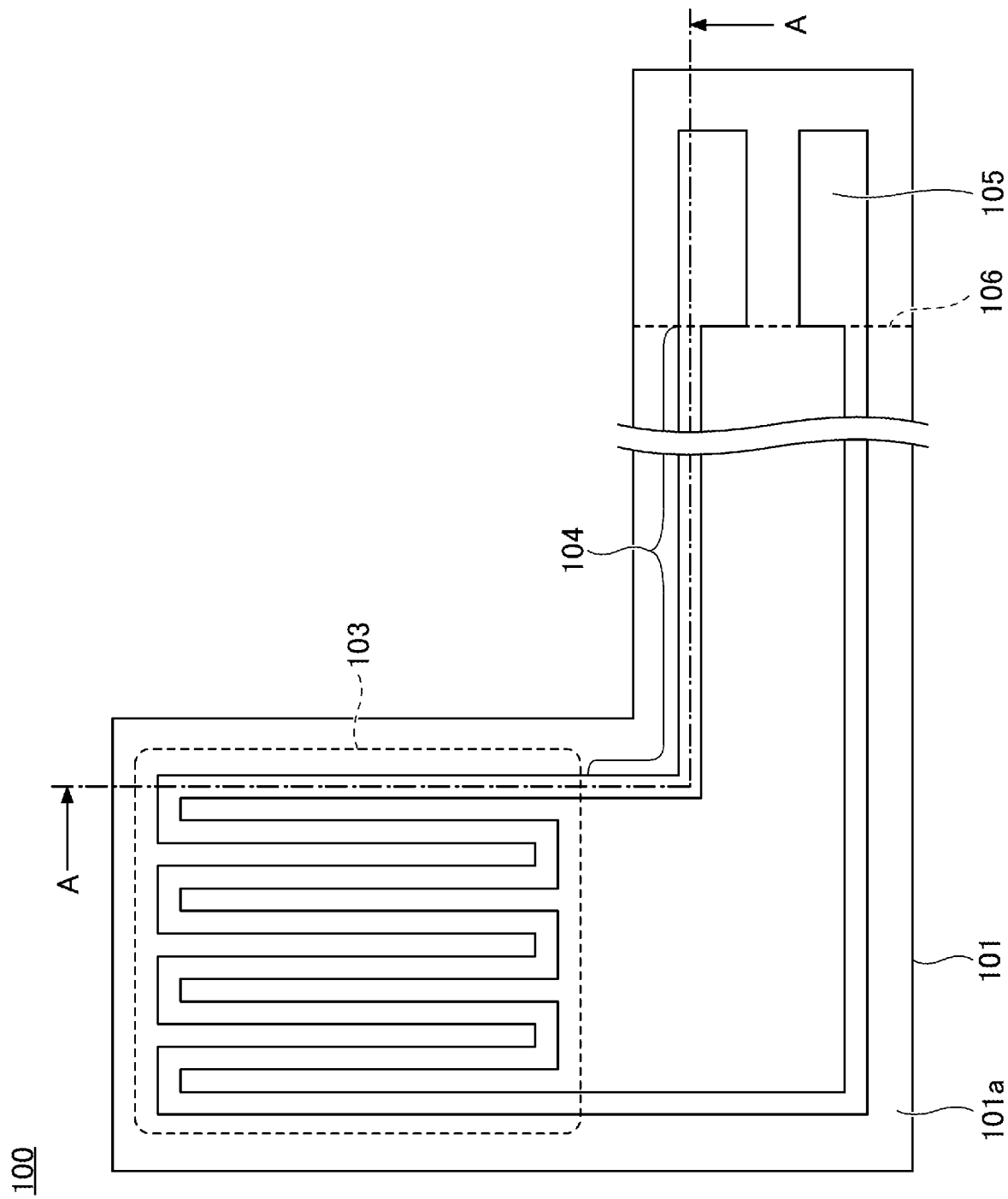
FIG. 8 is a plan view that shows an example of the strain gauge according to the first embodiment.
Figure 9:
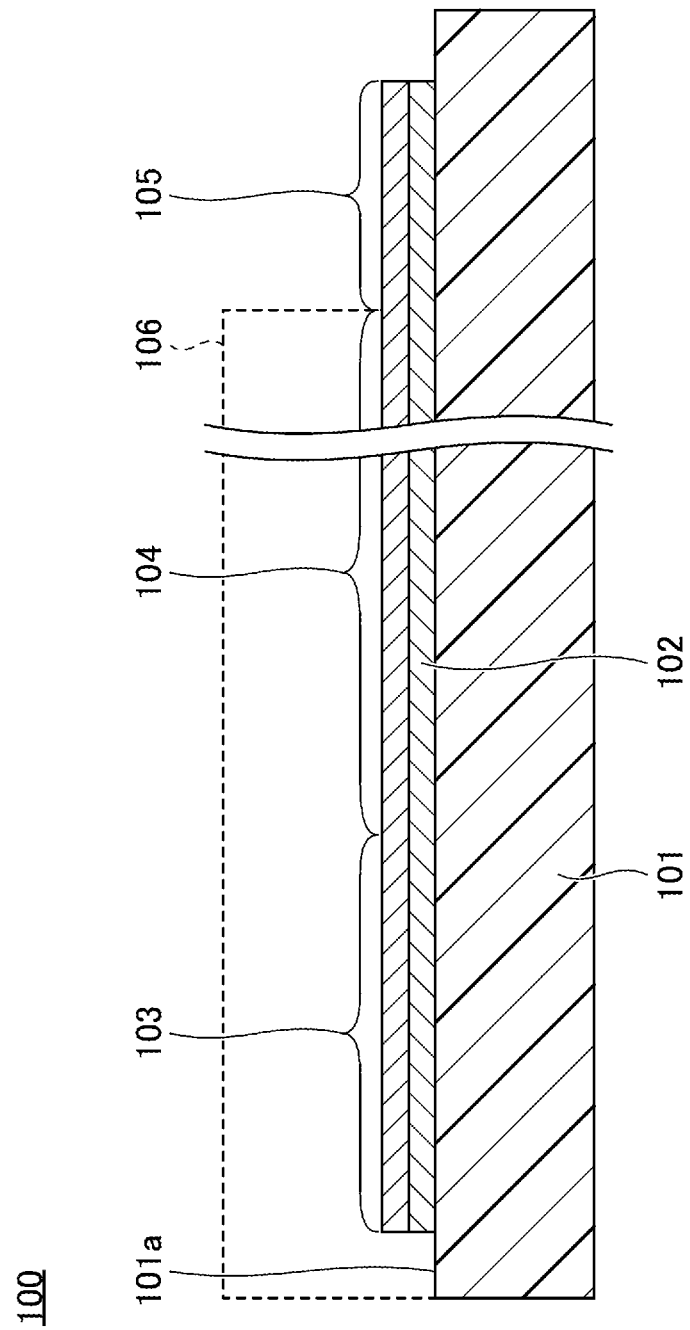
FIG. 9 is a cross-sectional view that shows an example of the strain gauge according to the first embodiment.

FIG. 8 is a plan view that shows an example of the strain gauge according to the first embodiment. FIG. 9 is a cross-sectional view that shows an example of the strain gauge according to the first embodiment, showing a cross-section along line A-A in FIG. 8.

Referring to FIGS. 8 and 9, the strain gauge 100 includes a substrate 101, a functional layer 102, a resistor 103, wires 104, and terminal parts 105. However, the functional layer 102 has only to be provided on an as-needed basis.

Note that, in this embodiment, for ease of explanation, in the strain gauge 100, the side of the substrate 101 where the resistor 103 is provided is referred to as "the upper side" or "one side," and the side where the resistor 103 is not provided is referred to as "the lower side" or "the other side." Also, the surface of each part on the side where the resistor 103 is provided is defined as "one surface" or "the upper surface," and the surface of each part on the side where the resistor 103 is not provided is defined as "the other surface" or "the lower surface." However, the strain gauge 100 can be used upside down or placed at any angle. Furthermore, plan view refers to viewing an object from the direction normal to the upper surface 101a of the substrate 101. A planar shape refers to the shape of an object viewed from the direction normal to the upper surface 101a of the substrate 101.

The substrate 101 is a member to serve as a base layer for forming the resistor 103 and the like, and is flexible. The thickness of the substrate 101 is not particularly limited and can be selected as appropriate according to the purpose, and can be, for example, approximately 5 µm to 500 µm. In particular, it is preferable, from the perspective of the transmissibility of strain from the surface of the strain-generating body (for example, the thin part of the bearing holder) joined to the lower surface of the substrate 101 via the adhesive layer, the dimensional stability with respect to the environment, and so forth, if the thickness of the substrate 101 is 5 µm to 200 µm. It is more preferable, from the perspective of insulation, if the thickness of the substrate 101 is 10 µm or more.

The substrate 101 can be made of an insulating resin film of, for example, PI (polyimide) resin, epoxy resin, PEEK (polyetheretherketone) resin, PEN (polyethylene naphthalate) resin, PET (polyethylene terephthalate) resin, PPS (polyphenylene sulfide) resin, polyolefin resin, and so forth. Note that a film refers to a flexible member that is approximately 500 µm thick or less.

Here, "made of an insulating resin film" does not prevent the substrate 101 from containing fillers, impurities, and so forth, in the insulating resin film. The substrate 101 may be made of, for example, an insulating resin film containing fillers such as silica, alumina, and so forth.

Materials for the substrate 101 other than resins include, for example, crystalline materials such as $SiO_2$, $ZrO_2$ (including YSZ), Si, $Si_2N_3$, $Al_2O_3$ (including sapphire), ZnO, perovskite ceramics ($CaTiO_3$, $BaTiO_3$), and so forth. Furthermore, amorphous glass and the like may be used as well. Also, for materials for the substrate 101, metals such as aluminum, an aluminum alloy (duralumin), or titanium may be used. In this case, for example, an insulating film is formed on the substrate 101 made of metal.

The functional layer 102 is formed on the upper surface 101a of the substrate 101, as a lower layer of the resistor 103. That is, the planar shape of the functional layer 102 is substantially the same as the planar shape of the resistor 103 shown in FIG. 8.

In the present application, a functional layer refers to a layer having a function of facilitating the crystal growth of at least the resistor 103, which is a higher layer. The functional layer 102 preferably further has a function of preventing oxidation of the resistor 103 due to the oxygen and moisture contained in the substrate 101 and a function of improving the adhesion between the substrate 101 and the resistor 103. The functional layer 102 may have other functions as well.

Since the insulating resin film that constitutes part of the substrate 101 contains oxygen and moisture, especially when the resistor 103 contains Cr (chromium), Cr forms a self-oxidizing film; it is therefore effective for the functional layer 102 to have the function of preventing oxidation of the resistor 103.

The material of the functional layer 102 is not particularly limited as long as it has a function of facilitating the crystal growth of at least the resistor 103, which is a higher layer, and can be selected as appropriate according to the purpose. For example, the material of the functional layer 102 can be one or more metals selected from the group consisting of Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum), may be an alloy of metals in this group, or may be a compound of metals in this group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

In the event the functional layer 102 is made of a conductive material such as a metal or an alloy, the thickness of the functional layer 102 is preferably 1/20 or less of the thickness of the resistor. In this range, it is possible to facilitate the crystal growth of α-Cr, and prevent a situation in which part of the current flowing in the resistor flows into the functional layer 102 and lowers the sensitivity of strain detection.

In the event the functional layer 102 is made of a conductive material such as a metal or an alloy, the thickness of the functional layer 102 is more preferably 1/50 or less of the thickness of the resistor. In this range, it is possible to facilitate the crystal growth of α-Cr, and prevent, even more reliably, a situation in which part of the current flowing in the resistor flows into the functional layer 102 and lowers the sensitivity of strain detection.

In the event the functional layer 102 is made of a conductive material such as a metal or an alloy, the thickness of the functional layer 102 is more preferably 1/100 or less of the thickness of the resistor. In this range, it is possible to prevent, even more reliably, a situation in which part of the current flowing in the resistor flows into the functional layer 102 and lowers the sensitivity of strain detection.

In the event the functional layer 102 is made of an insulating material such as oxide or nitride, the thickness of the functional layer 102 is preferably between 1 nm and 1 μm. In this range, it is possible to facilitate the crystal growth of α-Cr, and form the function layer 102 with ease, without forming cracks in the functional layer 102.

In the event the functional layer 102 is made of an insulating material such as oxide or nitride, the thickness of the functional layer 102 is more preferably between 1 nm and 0.8 μm. In this range, it is possible to facilitate the crystal growth of α-Cr, and form the functional layer 102 with more ease, without forming cracks in the functional layer 102.

In the event the functional layer 102 is made of an insulating material such as oxide or nitride, the thickness of the functional layer 102 is even more preferably between 1 nm and 0.5 μm. In this range, it is possible to facilitate the crystal growth of α-Cr, and form the functional layer 102 with more ease, without forming cracks in the functional layer 102.

Note that the planar shape of the functional layer 102 is, for example, patterned to be substantially the same as the planar shape of the resistor shown in FIG. 8. However, the planar shape of the functional layer 102 is not limited to being substantially the same as the planar shape of the resistor. In the event the functional layer 102 is made of an insulating material, it does not have to be patterned into the same shape as the planar shape of the resistor. In this case, the functional layer 102 may be formed flat and solid at least in the region where the resistor is formed. Alternatively, the functional layer 102 may be formed flat and solid over the entire upper surface of the substrate 101.

In addition, when the functional layer 102 is made of an insulating material, the functional layer 102 may be formed relatively thick, flat, and solid, such that its thickness is between 50 nm and 1 μm, so that the thickness and surface area of the functional layer 102 increase, and the heat that is produced by the resistor can be dissipated toward the substrate 101 side. As a result of this, in the strain gauge 100, it is possible to prevent deterioration of the accuracy of measurement due to the self-heating of the resistor.

The resistor 103 is a thin film formed on the upper surface of the functional layer 102 in a predetermined pattern, and is a sensing part that changes its resistance when exposed to strain.

The resistor 103 can be made of, for example, a material containing Cr (chromium), a material containing Ni (nickel), or a material containing both Cr and Ni. That is, the resistor 103 can be made of a material containing at least one of Cr and Ni. Materials containing Cr include, for example, a Cr composite film. Materials containing Ni include, for example, Cu—Ni (copper nickel). Materials containing both Cr and Ni include, for example, Ni—Cr (nickel chromium).

Hereinafter, a case in which the resistor 103 is a Cr composite film will be described as an example. Here, the Cr composite film is a film in which Cr, CrN, $Cr_2N$, and so forth are mixed. The Cr composite film may contain inevitable impurities such as chromium oxide. Also, part of the materials forming the functional layer 102 may diffuse to the Cr composite film. In this case, the materials forming the functional layer 102 and nitrogen may form a compound. For example, when the functional layer 102 is made of Ti, the Cr composite film may contain Ti and TiN (titanium nitride).

The thickness of the resistor 103 is not particularly limited and can be selected as appropriate according to the purpose. For example, the thickness of the resistor 103 may be made approximately 0.05 μm to 2 μm. In particular, when the thickness of the resistor 103 is 0.1 μm or more, it is preferable in that the crystallinity of crystals forming the resistor 103 (for example, the crystallinity of α-Cr) improves. Furthermore, it is more preferable if the thickness of the resistor 103 is 1 μm or less in that cracks in the film and warping from the substrate 101 due to internal stress of the film can be reduced.

By forming the resistor 103 on top of the functional layer 102, the resistor 103 can be formed from a stable crystal phase, so that the stability of gauge characteristics (gauge factor, temperature coefficient of gauge factor TCS, and temperature coefficient of resistance TCR) can be improved.

For example, when the resistor 103 is a Cr composite film, by providing a functional layer 102, a resistor 103, in which α-Cr (alpha chromium) is the main component, can be formed. Since α-Cr is a stable crystal phase, the stability of gauge characteristics can be improved.

Here, the main component means that the substance of interest accounts for 50% or more of all substances constituting the resistor by weight. For example, when the resistor 103 is a Cr composite film, from the perspective of improving the gauge characteristics, it is preferable if α-Cr accounts for 80% or more of the resistor 103 by weight, and it is even more preferable if α-Cr accounts for 90% or more of the resistor 103 by weight. Note that α-Cr is a Cr with a bcc structure (body-centered cubic lattice structure).

Moreover, when the resistor 103 is a Cr composite film, the CrN and $Cr_2N$ contained in the Cr composite film are preferably 20% or less by weight. When the CrN and $Cr_2N$ contained in the Cr composite film are 20% by weight or less, the decrease in the gauge factor can be reduced.

The proportion of $Cr_2N$ in CrN and $Cr_2N$ is preferably 80% or more by weight and less than 90% by weight, and, more preferably 90% or more by weight and less than 95% by weight. When the proportion of $Cr_2N$ in CrN and $Cr_2N$ is 90% or more by weight and less than 95% by weight, $Cr_2N$, which has semiconductor-like properties, reduces the TCR (negative TCR) even more noticeably. Furthermore, by reducing the ceramicization, brittle fracture can be reduced.

On the other hand, when a small amount of $N_2$ or atomic N is mixed and present in the film, the external environment (for example, a high-temperature environment) might cause it to escape from the film to the outside, resulting in changes in the film stress. By creating a chemically stable CrN, a stable strain gauge can be obtained without generating the above unstable N.

Also, the metal (for example, Ti) constituting part of the functional layer 102 diffuses to the Cr composite film, thereby providing improved gauge characteristics. To be more specific, the gauge factor of the strain gauge 100 can be made 10 or higher, and the temperature coefficient of gauge factor TCS and the temperature coefficient of resistance TCR can be kept in the range of −1000 ppm/degrees Celsius to +1000 ppm/degrees Celsius.

The terminal parts 105 extend from both end parts of the resistor 103 via the wires 104, and are formed in a substantially rectangular shape that is wider than the resistor 103 and the wires 104 in plan view. The terminal parts 105 are a pair of electrodes for outputting, to the outside, the strain-induced changes in the resistance value of the resistor 103. For example, the resistor 103 extends from one side of the terminal parts 105 and the wires 104, zigzags back and forth, and is connected to the other side of the wires 104 and the terminal parts 105. The top surface of the terminal parts 105 may be coated with a metal that solders better than the terminal parts 105.

Note that, although the resistor 103, the wires 104, and the terminal parts 105 are assigned different codes for ease of explanation, they can be formed integrally from the same material in the same process.

A cover layer 106 (insulating resin layer) may be provided on the upper surface 101a of the substrate 101 so as to cover the resistor 103 and the wires 104 and expose the terminal parts 105. By providing the cover layer 106, the resistor 103 and the wires 104 can be prevented from being mechanically damaged. Also, by providing the cover layer 106, the resistor 103 and the wires 104 can be protected from moisture and the like. Note that the cover layer 106 may be provided so as to cover the entire portion except for the terminal parts 105.

The cover layer 106 can be made of insulating resin such as PT resin, epoxy resin, PEEK resin, PEN resin, PET resin, PPS resin, composite resin (for example, silicone resin, polyolefin resin, etc.). The cover layer may contain fillers and pigments. The thickness of the cover layer is not particularly limited and can be selected as appropriate according to the purpose, and can be, for example, approximately 2 μm to 30 μm.

To manufacture the strain gauge 100, first, the substrate 101 is prepared and the functional layer 102 is formed on the top surface 101a of the substrate 101. The materials and the thicknesses of the substrate 101 and the functional layer 102 are as described above. However, the functional layer 102 has only to be provided on an as-needed basis.

The functional layer 102 can be vacuum-formed by, for example, the conventional sputtering method, which uses a raw material that can form the functional layer 102 as a target, and which introduces Ar (argon) gas into a chamber. By using the conventional sputtering method, the functional layer 102 is formed while the upper surface 101a of the substrate 101 is etched with Ar, so that it is possible to keep the amount of the functional layer 102 formed minimal and achieve an effect of improved adhesion.

However, this is one example method of forming the functional layer 102, and the functional layer 102 may be formed by other methods as well. For example, a method may be used, in which, before formation of the functional layer 102, the upper surface 101a of the substrate 101 is activated by plasma treatment using Ar or the like, so as to obtain an effect of improving the adhesion, and then the functional layer 102 is vacuum-formed by magnetron sputtering.

Next, after forming a metal layer that will serve as the resistor 103, the wires 104, and the terminal parts 105 over the entire upper surface of the functional layer 102, the functional layer 102, the resistor 103, the wires 104, and the terminal parts 105 are patterned into the planar shape shown in FIG. 8 by using photolithography. The materials and the thicknesses of the resistor 103, the wires 104, and the terminal parts 105 are as described above. The resistor 103, the wires 104, and the terminal parts 105 can be formed integrally from the same material. The resistor 103, the wires 104, and the terminal parts 105 can be formed by, for example, magnetron sputtering using raw materials that can form the resistor 103, the wires 104, and the terminal parts 105 as targets. The resistor 103, the wires 104, and the terminal parts 105 may be formed by using reactive sputtering, vapor deposition, arc ion plating, pulse laser deposition, and so forth, instead of magnetron sputtering.

The combination of the material for the functional layer 102 and the material for the resistor 103, the wires 104, and the terminal parts 105 is not particularly limited, and can be selected as appropriate according to the purpose. For example, Ti can be used as the functional layer 102, and, for the resistor 103, the wires 104, and the terminal parts 105, a Cr composite film containing α-Cr (alpha chromium) as the main component can be formed.

In this case, for example, magnetron sputtering to use a raw material that can form a Cr composite film as a target, and introduce Ar gas into a chamber may be used to form the resistor 103, the wires 104, and the terminal parts 105. Alternatively, the resistor 103, the wires 104, and the terminal parts 105 may be formed by reactive sputtering that uses pure Cr as a target, and introduces an appropriate amount of nitrogen gas together with Ar gas into a chamber. In this case, for example, by changing the amount and pressure (nitrogen partial pressure) of nitrogen gas to introduce, by adjusting the heating temperature by providing a heating step, and so forth, the proportion of CrN and CrN contained in the Cr composite film, and the proportion of $Cr_2N$ in CrN and $Cr_2N$ can be adjusted.

According to these methods, the growth surface of the Cr composite film is defined by the functional layer 102 made of Ti, and a Cr composite film that is composed mainly of α-Cr having a stable crystal structure can be formed. In addition, Ti constituting part of the functional layer 102 diffuses inside the Cr composite film, and thereby improves the gauge characteristics. For example, the gauge factor of the strain gauge 100 can be made 10 or higher, and the temperature coefficient of gauge factor TCS and the temperature coefficient of resistance TCR can be kept in the range of −1000 ppm/degrees Celsius to +1000 30 ppm/degrees Celsius.

Note that, when the resistor 103 is a Cr composite film, the functional layer 102, which is made of Ti, has all of the function of facilitating the crystal growth of the resistor 103, the function of preventing oxidation of the resistor 103 due to the oxygen and moisture contained in the substrate 101, and the function of improving the adhesion between the substrate 101 and the resistor 103. The same is true when Ta, Si, Al, or Fe is used for the functional layer 102, instead of Ti.

After that, if necessary, the strain gauge 100 is completed by providing a cover layer 106 that covers the resistor 103 and the wires 104 and exposes the terminal parts 105 on the upper surface 101a of the substrate 101. The cover layer 106 is formed by, for example, laminating a semi-cured thermosetting insulating resin film on the upper surface 101a of the substrate 101 so as to cover the resistor 103 and the wires 104 and expose the terminal parts 105, and by heating and curing this film. The cover layer 106 may alternatively be prepared by coating the upper surface 101a of the substrate 101 with a liquid or paste thermosetting insulating resin so as to cover the resistor 103 and the wires 104 and expose the terminal parts 105, and by heating and curing this resin.

By providing the functional layer 102 below the resistor 103 in this manner, the crystal growth of the resistor 103 can be facilitated, and the resistor 103 can be produced in a stable crystal phase. As a result of this, in the strain gauge 100, the stability of gauge characteristics can be improved. In addition, the material forming the functional layer 102 diffuses into the resistor 103, so that the gauge characteristics of the strain gauge 100 can be improved.

Note that the strain gauge 100 using a Cr composite film as the material of the resistor 103 achieves heightening of sensitivity (500% or more compared to conventional ones)

and reduction in size (1/10 or less compared to conventional ones). For example, whereas the output of a conventional strain gauge is approximately 0.04 mV/2 V, with the strain gauge 100, an output of 0.3 mV/2 V or more can be obtained. Moreover, while the size of a conventional strain gauge (gauge length×gauge width) is approximately 3 mm×3 mm, the size of the strain gauge 100 (gauge length×gauge width) can be reduced to approximately 0.3 mm×0.3 mm.

Thus, the strain gauge 100 using a Cr composite film as the material of the resistor 103 is small in size, and can be attached to the thin part 62 of the bearing holder 60 with ease. Therefore, it is particularly suitable for use in a rolling bearing holder unit using a small rolling bearing 2 that is 30 mm or less in diameter (the outer diameter of the outer ring 10). Moreover, the strain gauge 100 using a Cr composite film as the material of the resistor 103 is highly sensitive and can detect small displacements, so that it is possible to detect minimal strains that have been difficult to detect heretofore. That is, by having the strain gauge 100 using a Cr composite film as the material of the resistor 103, the rolling bearing holder unit 1 having a function of detecting strain accurately can be realized.

Modifications of the First Embodiment

A modification 1 of the first embodiment shows another example of a bearing holder attached to the outer circumferential surface of the outer ring. Note that, in modification 1 of the first embodiment, the description of the same components as those of the embodiment described above may be omitted.

Figure 10:
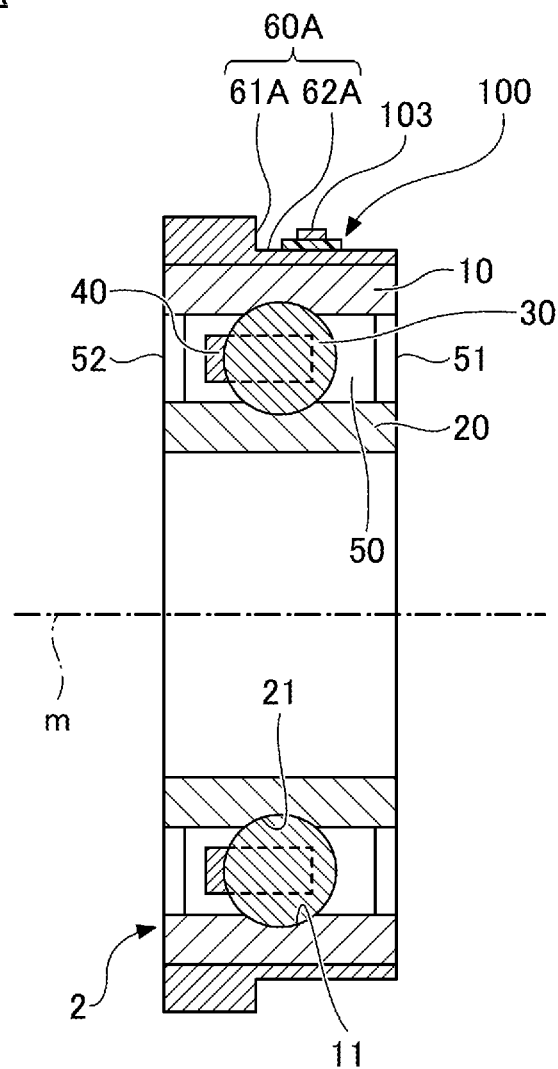
FIG. 10 is a cross-sectional view that shows an example of a rolling bearing holder unit according to a modification 1 of the first embodiment.

FIG. 10 is a cross-sectional view that shows an example of a rolling bearing holder unit according to modification 1 of the first embodiment, and shows a cross-section corresponding to FIG. 2(b). As shown in FIG. 10, the rolling bearing holder unit 1A differs from the rolling bearing holder unit 1 (see, for example, FIG. 2) in that the bearing holder 60 is replaced by a bearing holder 60A.

The bearing holder 60A has a large-diameter part 61A of a cylindrical shape and a small-diameter part 62A of a cylindrical shape. The small-diameter part 62A is placed over the entire outer circumferential side of the outer ring 10, and the large-diameter part 61A is placed in part of the outer circumferential side of the small-diameter part 62A. The inner diameter of the small-diameter part 62A is substantially equal to the outer diameter of the outer ring 10, and the length of the small-diameter part 62A in the direction of the rotation axis m is substantially equal to the length of the outer ring 10 in the direction of the rotation axis m. The inner diameter of the large-diameter part 61A is substantially equal to the outer diameter of the small-diameter part 62A, and the length of the large-diameter part 61A in the direction of the rotation axis m is shorter than the length of the small-diameter part 62A in the direction of the rotation axis m.

The large-diameter part 61A and the small-diameter part 62A are integrated by, for example, press-fitting or bonding, and form a bearing holder 60A having substantially the same shape as the bearing holder 60. In the bearing holder 60A, the portion where the large-diameter part 61A is layered over the outer circumferential surface of the small-diameter part 62A is the thick part, and the portion consisting only of the small-diameter part 62A is the thin part. The strain gauge 100 is placed, via an adhesive layer, on the outer circumferential surface of the small-diameter part 62A, which is the thin part.

Thus, the bearing holder is not limited to being one that is molded integrally, and may be one that is formed by joining separate bodies together. For example, separate members having different diameters may be joined together and form a bearing holder. In this case, too, by placing the strain gauge 100 in the thin part, the strain of the outer ring 10 can be detected via the thin part, which serves as a strain-transmitting part. Also, the thick part is placed in contact at least with the region $D_o$ (see FIG. 3) of the outer circumferential surface of the outer ring 10, and therefore the rigidity of the shaft to be inserted in the rolling bearing holder unit 1A can be ensured. Note that the bearing holder is not limited to being one that is molded integrally, and may be formed by joining separate bodies together, and this applies to all the examples of the bearing holder described hereinafter.

Figure 11:
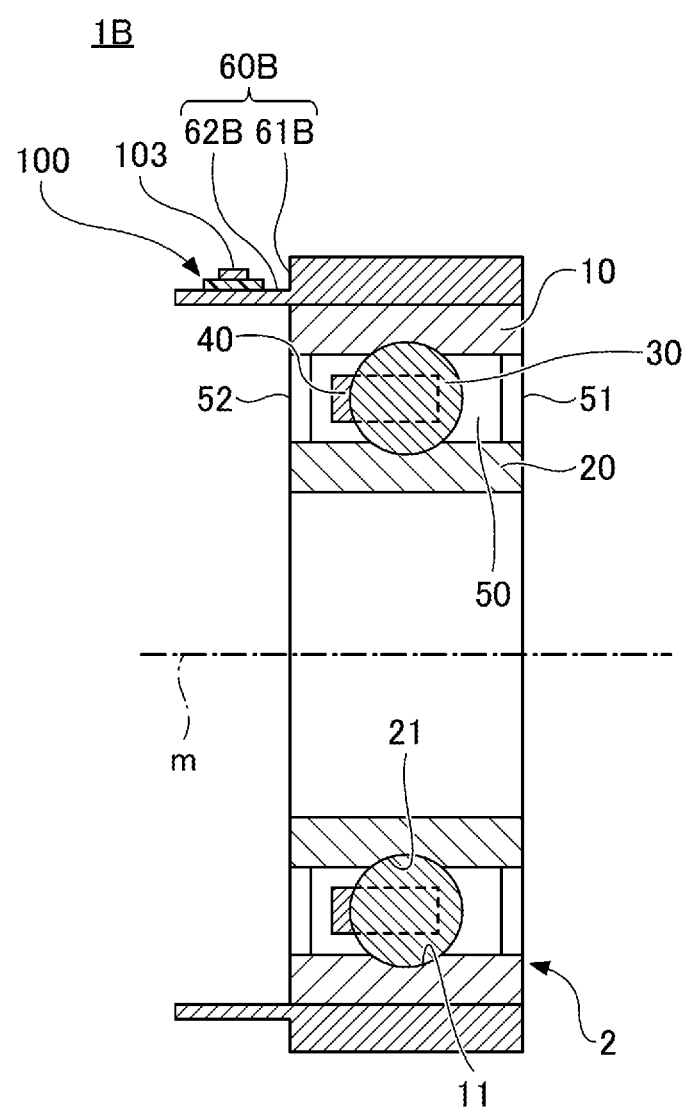
FIG. 11 is a cross-sectional view that shows an example of a rolling bearing holder unit according to a modification 2 of the first embodiment.

FIG. 11 is a cross-sectional view that shows an example of a rolling bearing holder unit according to a modification 2 of the first embodiment, showing a cross-section corresponding to FIG. 2(b). As shown in FIG. 11, the rolling bearing holder unit 1B differs from the rolling bearing holder unit 1 (see, for example, FIG. 2) in that the bearing holder 60 is replaced by a bearing holder 60B.

The bearing holder 60B has a cylindrical thick part 61B and a cylindrical thin part 62B, its thickness in the radial direction being thinner than the thick part 61B. The inner diameter of the thick part 61B is substantially equal to the outer diameter of the outer ring 10, and the length of the thick part 61B in the direction of the rotation axis m is substantially equal to the length of the outer ring 10 in the direction of the rotation axis m. That is, the thick part 61B is placed in contact with the entire outer circumferential surface of the outer ring 10.

The thin part 62B has an inner diameter that is substantially equal to the outer diameter of the outer ring 10. The thin part 62B protrudes from the end surface of the thick part 61B located on the preloaded side such that the thin part 62B protrudes from the side of the end surface of the thick part 61B nearer to the rotation axis m, in a direction that is substantially parallel to the direction of the rotation axis m. The thick part 61B and the thin part 62B are molded integrally, for example. The strain gauge 100 is placed on the outer circumferential surface of the thin part 62B via an adhesive layer. Note that, although FIG. 11 shows an example in which the thin part 62B protrudes from the end surface of the thick part 61B located on the preloaded side, the thin part 62B may protrude from the end surface located on the opposite side from the preloaded side. It is preferable if the thin part 62B protrudes from the preloaded end surface, because the strain is transmitted better.

In this way, the length of the thick part 61B in the direction of the rotation axis m may be substantially equal to the length of the outer ring 10 in the direction of the rotation axis m, and the thin part 62B may protrude from the side of the end surface of the thick part 61B nearer to the rotation axis m, in a direction substantially parallel to the direction of the rotation axis m. In this case, too, by placing the strain gauge 100 in the thin part, the strain of the outer ring 10 can be detected via the thin part, which serves as a strain-transmitting part. Moreover, since the thick part can be placed in contact with the entire surface of the outer circumferential surface of the outer ring 10, the rigidity of the shaft to be inserted in the rolling bearing holder unit 1B can be sufficiently ensured.

Figure 12:
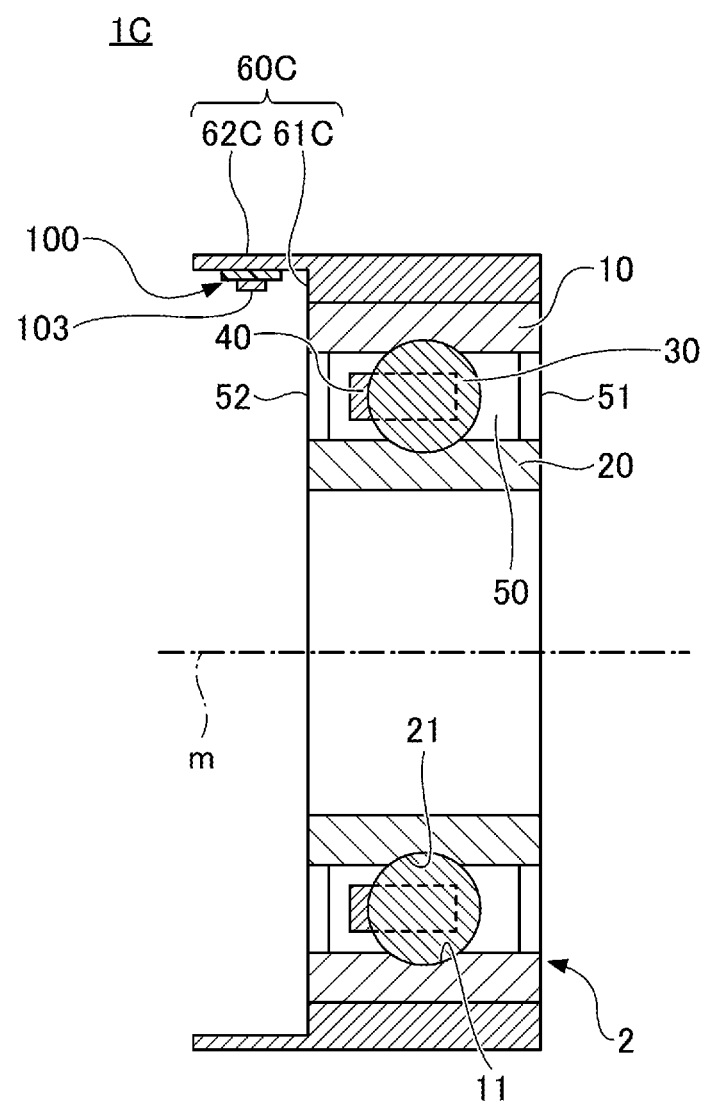
FIG. 12 is a cross-sectional view that shows an example of a rolling bearing holder unit according to a modification 3 of the first embodiment.

FIG. 12 is a cross-sectional view that shows an example of a rolling bearing holder unit according to a modification 3 of the first embodiment, showing a cross-section corresponding to FIG. 2(b). Like the bearing holder 60C of the rolling bearing holder unit 1C shown in FIG. 12, the thin part 62C may protrude from the end surface of the thick part 61C located on the preloaded side such that the thin part 62C protrudes from the side of the end surface of the thick part 61C farther from the rotation axis m, in a direction that is substantially parallel to the direction of the rotation axis m. In this case, also, the same effect as in FIG. 11 is provided.

Figure 13:
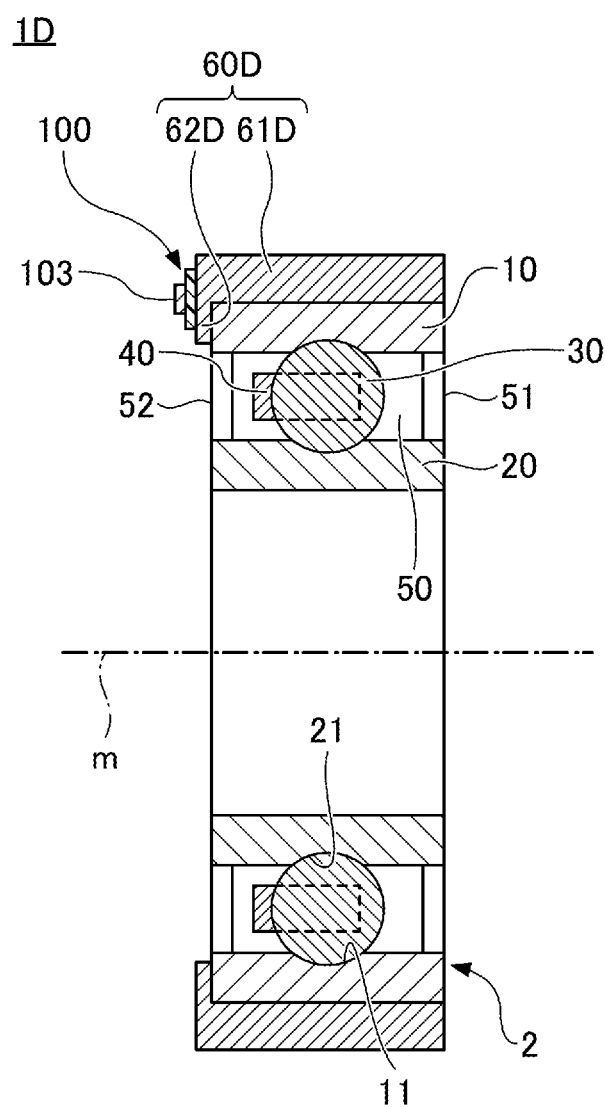
FIG. 13 is a cross-sectional view that shows an example of a rolling bearing holder unit according to a modification 4 of the first embodiment.

FIG. 13 is a cross-sectional view that shows an example of a rolling bearing holder unit according to a modification 4 of the first embodiment, showing a cross-section corresponding to FIG. 2(b). As shown in FIG. 13, the rolling bearing holder unit 1D differs from the rolling bearing holder unit 1 (see, for example, FIG. 2) in that the bearing holder 60 is replaced by a bearing holder 60D.

The bearing holder 60D has a cylindrical thick part 61D, and a cylindrical thin part 62D that is thinner than the thick part 61D. The inner diameter of the thick part 61D is substantially equal to the outer diameter of the outer ring 10, and the length of the thick part 61D in the direction of the rotation axis m is substantially equal to the length of the outer ring 10 in the direction of the rotation axis m.

That is, the thick part 61D is placed in contact with the entire outer circumferential surface of the outer ring 10.

The thin part 62D extends from the end surface of the thick part 61D located on the preloaded side, in a direction that is substantially perpendicular to the rotation axis m, and is placed in annular contact with part of an end surface of the outer ring 10. The thickness of the thin part 62D in the direction of the rotation axis m is thinner than the thickness of the thick part 61D in the radial direction. The thick part 61D and the thin part 62D are molded integrally, for example. On the surface of the thin part 62D, opposite the side in contact with the end surface of the outer ring 10, the strain gauge 100 is placed via an adhesive layer.

Thus, the thin part of the bearing holder may be placed in contact with an end surface of the outer ring 10. In this case, too, by placing the strain gauge 100 in the thin part, the strain of the outer ring 10 can be detected via the thin part, which serves as a strain-transmitting part. Also, since the thick part can be placed in contact with the entire surface of the outer circumferential surface of the outer ring 10, the rigidity of the shaft to be inserted in the rolling bearing holder unit 1D can be sufficiently ensured.

Second Embodiment

A second embodiment shows an example of a bearing holder attached to the inner circumferential surface of the inner ring. Note that, in the second embodiment, the description of the same components as those of the above-described embodiment may be omitted.

Figure 14:
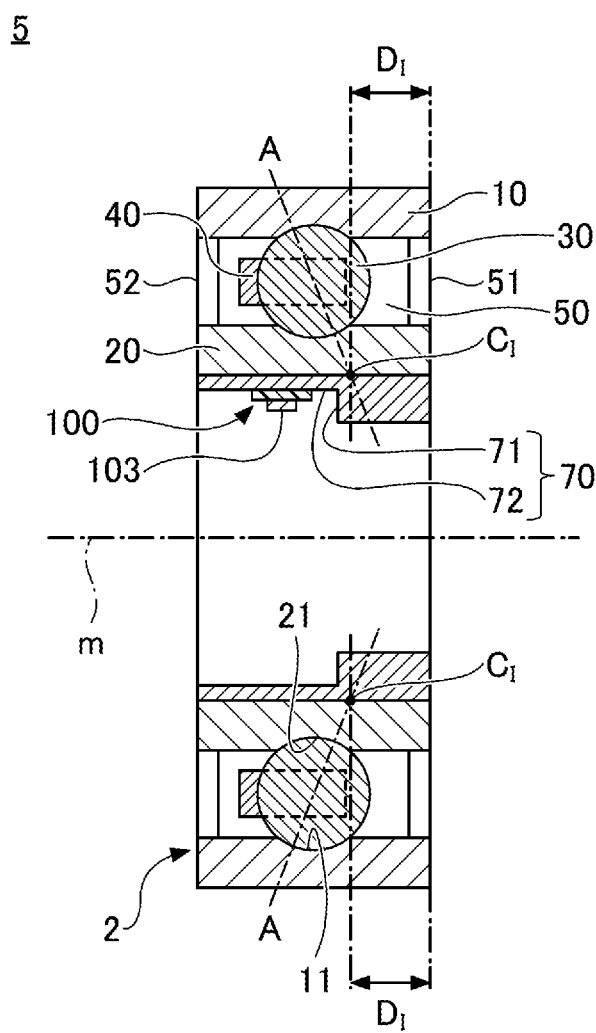
FIG. 14 is a cross-sectional view that shows an example of a rolling bearing holder unit according to a second embodiment.

FIG. 14 is a cross-sectional view that shows an example of the rolling bearing holder unit according to the second embodiment, showing a cross-section corresponding to FIG. 2(b). As shown in FIG. 14, the rolling bearing holder unit 5 differs from the rolling bearing holder unit 1 (see, for example, FIG. 2) in that the bearing holder 60 is replaced by a bearing holder 70.

The bearing holder 70 is placed on the inner circumferential side of the inner ring 20, and presses the inner circumferential surface of the inner ring 20 over the entire circumference. The bearing holder 70 is press-fitted into the inner ring 20, for example. Alternatively, the bearing holder 70 may be bonded to the inner ring 20.

The bearing holder 70 has: a cylindrical thick part 71; and a cylindrical thin part 72, the thickness of which in the radial direction is thinner than that of the thick part 71. The length of the bearing holder 70 in the direction of the rotation axis m is substantially equal to the length of the inner ring 20 in the direction of the rotation axis m. The thick part 71 and the thin part 72 have outer diameters that are substantially equal to the inner diameter of the inner ring 20, and are adjacent to each other in the direction of the rotation axis m. The thick part 71 and the thin part 72 are molded integrally, for example.

In this embodiment, the thickness of each of the thick part 71 and the thin part 72 is substantially constant. The thin part 72 is a strain-transmitting part that transmits the strain generated in the inner ring 20 when the rolling body 30 rotates, to the strain gauge 100. The strain gauge 100 is placed on the thin part 72 via an adhesive layer.

In FIG. 14, $C_I$ is the intersection of the extension of a straight line A and the inner circumferential surface of the inner ring 20 in cross-sectional view. In cross-sectional view, $D_I$ is a region of the inner circumferential surface of the inner ring 20, from the intersection point $C_I$ to the preloaded end surface, which is the end surface of the inner ring 20 nearer to the intersection point $C_I$. A region $D_I$ is a region where the displacement when the rolling body 30 rotates is relatively large.

Thus, the thin part of the bearing holder may be placed in contact with the inner circumferential surface of the inner ring 20. In this case, too, by placing the strain gauge 100 in the thin part, the strain of the inner ring 20 can be detected via the thin part, which serves as a strain-transmitting part. Also, by placing the thick part in contact at least with the region $D_I$ of the inner circumferential surface of the inner ring 20, the rigidity of the shaft to be inserted in the rolling bearing holder unit 5 can be ensured.

Modifications of the Second Embodiment

A modification 1 of the second embodiment shows another example of a bearing holder attached to the inner circumferential surface of the inner ring. Note that, in modification 1 of the second embodiment, the description of the same components as those of the above-described embodiments may be omitted.

Figure 15:
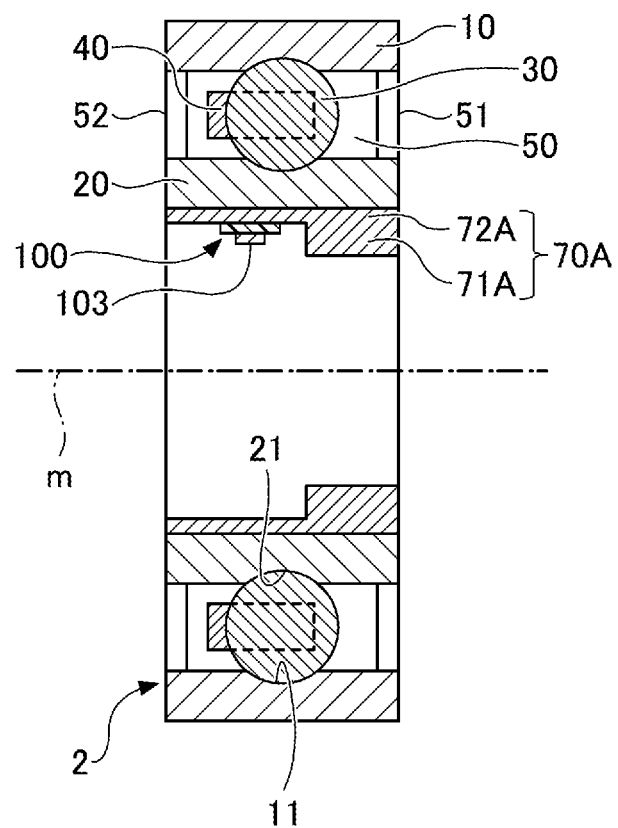
FIG. 15 is a cross-sectional view that shows an example of a rolling bearing holder unit according to a modification 1 of the second embodiment.

FIG. 15 is a cross-sectional view that shows an example of a rolling bearing holder unit according to a modification 1 of the second embodiment, showing a cross-section corresponding to FIG. 2(b). As shown in FIG. 15, the rolling bearing holder unit 5A differs from the rolling bearing holder unit 5 (see, for example, FIG. 14) in that the bearing holder 70 is replaced by a bearing holder 70A.

The bearing holder 70A has a cylindrical small-diameter part 71A and a cylindrical large-diameter part 72A. The large-diameter part 72A is placed over the entire inner circumferential side of the inner ring 20, and the small-diameter part 71A is placed in part of the inner circumferential side of the large-diameter part 72A. The outer diameter of the large-diameter part 72A is substantially equal to the inner diameter of the inner ring 20, and the length of the large-diameter part 72A in the direction of the rotation axis m is substantially equal to the length of the inner ring 20 in the direction of the rotation axis m. The outer diameter of the small-diameter part 71A is substantially equal to the inner diameter of the large-diameter part 72A, and the length of the small-diameter part 71A in the direction of the rotation axis m is shorter than the length of the large-diameter part 72A in the direction of the rotation axis m.

The small-diameter part 71A and the large-diameter part 72A are integrated by, for example, press-fitting or bonding, to form a bearing holder 70A having substantially the same shape as the bearing holder 70. In the bearing holder 70A, the portion where the small-diameter part 71A is layered over the inner circumferential surface of the large-diameter part 72A is the thick part, and the portion consisting only of the large-diameter part 72A is the thin part. The strain gauge 100 is placed, via an adhesive layer, on the inner circumferential surface of the large-diameter part 72A, which is the thin part.

Thus, the bearing holder is not limited to being one that is molded integrally, and may be one that is formed by joining separate bodies together. In this case, too, by placing the strain gauge 100 in the thin part, the strain of the inner ring 20 can be detected via the thin part, which serves as a strain-transmitting part. Also, the thick part is placed in contact at least with the region $D_f$ (see FIG. 14) of the inner circumferential surface of the inner ring 20, and therefore the rigidity of the shaft to be inserted in the rolling bearing holder unit 5A can be ensured. Note that the bearing holder is not limited to being one that is molded integrally, and may be formed by joining separate bodies together, and this applies to all the examples of the bearing holder described hereinafter.

Figure 16:
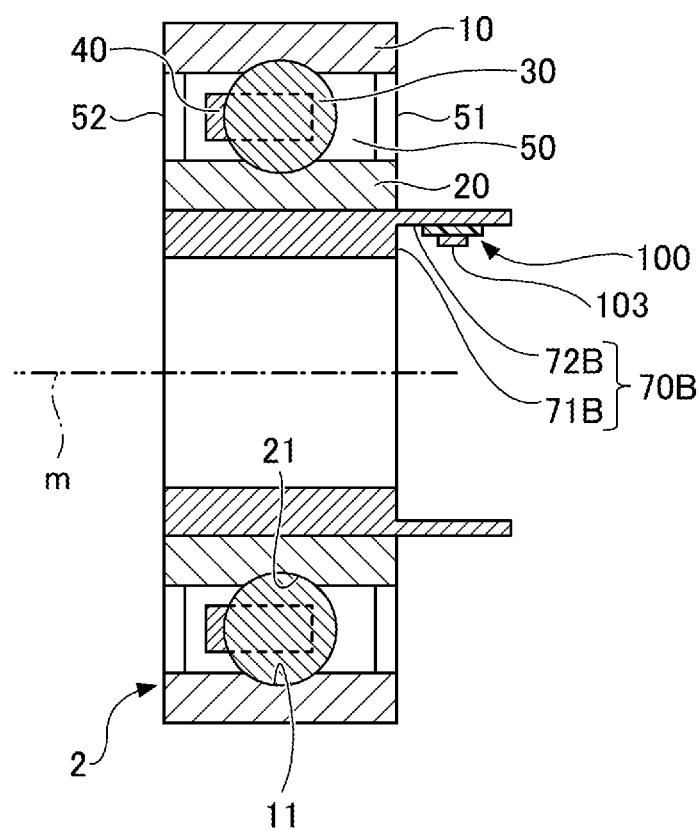
FIG. 16 is a cross-sectional view that shows an example of a rolling bearing holder unit according to a modification 2 of the second embodiment.

FIG. 16 is a cross-sectional view that shows an example of a rolling bearing holder unit according to a modification 2 of the second embodiment, showing a cross-section corresponding to FIG. 2(*b*). As shown in FIG. 16, the rolling bearing holder unit 5B differs from the rolling bearing holder unit 5 (see, for example, FIG. 14) in that the bearing holder 70 is replaced by a bearing holder 70B.

The bearing holder 70B has a cylindrical thick part 71B and a cylindrical thin part 72B, its thickness in the radial direction being thinner than the thick part 71B. The inner diameter of the thick part 71B is substantially equal to the outer diameter of the inner ring 20, and the length of the thick part 71B in the direction of the rotation axis m is substantially equal to the length of the inner ring 20 in the direction of the rotation axis m. That is, the thick part 71B is placed in contact with the entire inner circumferential surface of the inner ring 20.

The thin part 72B has an outer diameter that is substantially equal to the inner diameter of the inner ring 20. The thin part 72B protrudes from the end surface of the thick part 71B located on the preloaded side such that the thin part 72B protrudes from the side of the end surface of the thick part 71B farther from the rotation axis m, in a direction that is substantially parallel to the direction of the rotation axis m. The thick part 71B and the thin part 72B are molded integrally, for example. The strain gauge 100 is placed on the inner circumferential surface of the thin part 72B via an adhesive layer.

Thus, the thin part of the bearing holder may protrude from an end surface of the inner ring 20. In this case, too, by placing the strain gauge 100 in the thin part, the strain of the inner ring 20 can be detected via the thin part, which serves as a strain-transmitting part. Moreover, since the thick part can be placed in contact with the entire surface of the inner circumferential surface of the inner ring 20, the rigidity of the shaft to be inserted in the rolling bearing holder unit 5B can be sufficiently ensured.

Figure 17:
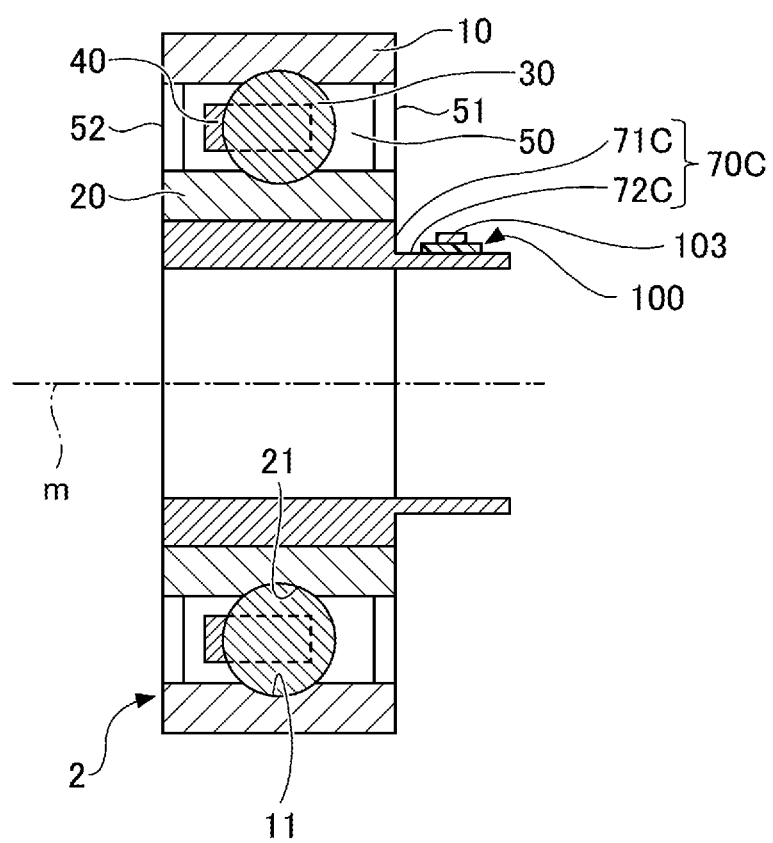
FIG. 17 is a cross-sectional view that shows an example of a rolling bearing holder unit according to a modification 3 of the second embodiment.

FIG. 17 is a cross-sectional view that shows an example of the rolling bearing holder unit according to a modification 3 of the second embodiment, showing a cross-section corresponding to FIG. 2(*b*). Like the bearing holder 70C of the rolling bearing holder unit 5C shown in FIG. 17, the thin part 72C may protrude from the end surface of the thick part 71C located on the preloaded side such that the thin part 72C protrudes from the side of the end surface of the thick part 71C nearer to the rotation axis m, in a direction that is substantially parallel to the direction of the rotation axis m. In this case, also, the same effect as in FIG. 16 is provided.

Figure 18:
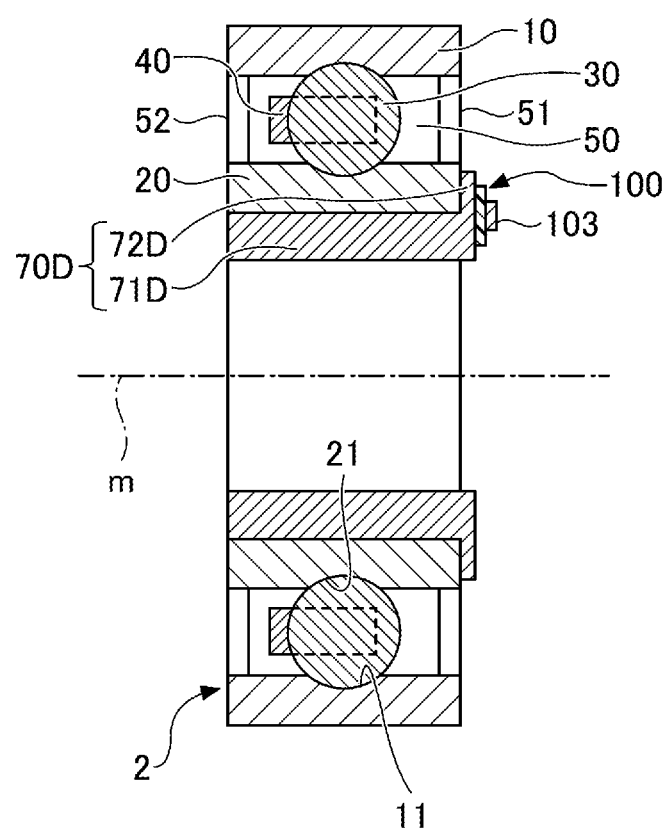
FIG. 18 is a cross-sectional view that shows an example of a rolling bearing holder unit according to a modification 4 of the second embodiment.

FIG. 18 is a cross-sectional view that shows an example of a rolling bearing holder unit according to a modification 4 of the second embodiment, showing 20 a cross-section corresponding to FIG. 2(*b*). As shown in FIG. 18, the rolling bearing holder unit 5D differs from the rolling bearing holder unit 5 (see, for example, FIG. 14) in that the bearing holder 70 is replaced by a bearing holder 70D.

The bearing holder 70D has a cylindrical thick part 71D, and a cylindrical thin part 72D that is thinner than the thick part 71D. The outer diameter of the thick part 71D is substantially equal to the inner diameter of the inner ring 20, and the length of the thick part 71D in the direction of the rotation axis m is substantially equal to the length of the inner ring 20 in the direction of the rotation axis m. That is, the thick part 71D is placed in contact with the entire inner circumferential surface of the inner ring 20.

The thin part 72D extends from the end surface of the thick part 71D located on the preloaded side, in a direction that is substantially perpendicular to the rotation axis m, and is placed in annular contact with part of an end surface of the inner ring 20. The thickness of the thin part 72D in the direction of the rotation axis m is thinner than the thickness of the thick part 71D in the radial direction. The thick part 71D and the thin part 72D are molded integrally, for example. On the surface of the thin part 72D, opposite the side in contact with the end surface of the inner ring 20, the strain gauge 100 is placed via an adhesive layer.

Thus, the thin part of the bearing holder may be placed in contact with an end surface of the inner ring 20. In this case, too, by placing the strain gauge 100 in the thin part, the strain of the inner ring 20 can be detected via the thin part, which serves as a strain-transmitting part. Also, since the thick part can be placed in contact with the entire surface of the inner circumferential surface of the inner ring 20, the rigidity of the shaft to be inserted in the rolling bearing holder unit 5D can be sufficiently ensured.

Third Embodiment

In a third embodiment, an example of a bearing holder in which the thin part is provided partially, not circumferentially, will be shown. Note that, in the third embodiment, the description of the same components as those of the above-described embodiments may be omitted.

Figure 19:
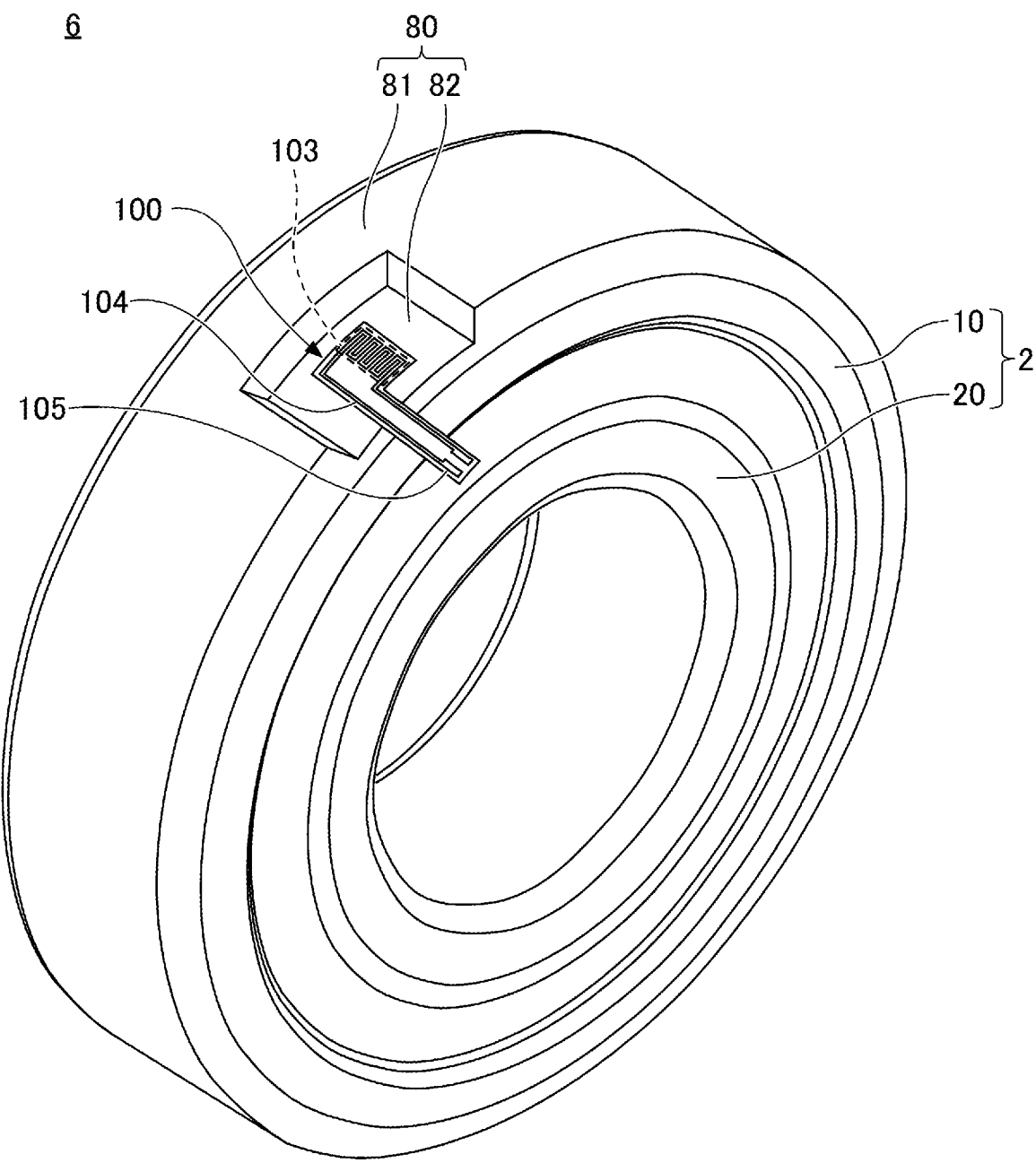
FIG. 19 is a perspective view that shows an example of a rolling bearing holder unit according to a third embodiment.

FIG. 19 is a perspective view that shows an example of a rolling bearing holder unit according to the third embodiment. As shown in FIG. 19, the rolling bearing holder unit 6 differs from the rolling bearing holder unit 1 (see, for example, FIG. 2) in that the bearing holder 60 is replaced by a bearing holder 80.

The bearing holder 80 is placed on the outer circumferential side of the outer ring 10, and presses the outer circumferential surface of the outer ring 10 over the entire circumference. The bearing holder 80 is press-fitted into the outer ring 10, for example. Alternatively, the bearing holder 80 may be bonded to the outer ring 10.

The bearing holder 80 is a cylindrical member. The length of the bearing holder 80 in the direction of the rotation axis m is substantially equal to the length of the outer ring 10 in the direction of the rotation axis m, and the inner diameter of the bearing holder 80 is substantially equal to the outer diameter of the outer ring 10. A recessed part is provided in the outer circumferential surface of the bearing holder 80. In the bearing holder 80, the portion other than the recessed part is a thick part 81, and the inside of the recessed part is a thin part 82. That is, in the bearing holder 80, the thick part 81 is cylindrical, and the thin part 82 is a recessed part that is provided in the thick part 81.

The thin part 82 is a strain-transmitting part that transmits the strain generated in the outer ring 10 when the rolling body 30 rotates, to the strain gauge 100. The strain gauge 100 is placed on the thin part 82 via an adhesive layer.

In this manner, it is possible to provide a recessed part, which serves as a thin part, in the outer periphery of the bearing holder, and place the strain gauge in the recessed part. In this case, too, the strain of the outer ring 10 can be detected via the thin part, which is a strain-transmitting part. In addition, by placing the thick part in contact at least with the region $D_o$ of the outer circumferential surface of the outer ring 10, the rigidity of the shaft to be inserted in the rolling bearing holder unit 6 can be ensured. Note that, also, in the modifications of the first embodiment, the second embodiment, and the modifications of the second embodiment, the thin part may be provided partially as a recessed part, instead of in a circumferential manner.

Fourth Embodiment

A fourth embodiment shows an example of a rolling bearing holder unit having two rolling bearings. Note that, in the fourth embodiment, the description of the same components as those of the above-described embodiments may be omitted.

Figure 20:
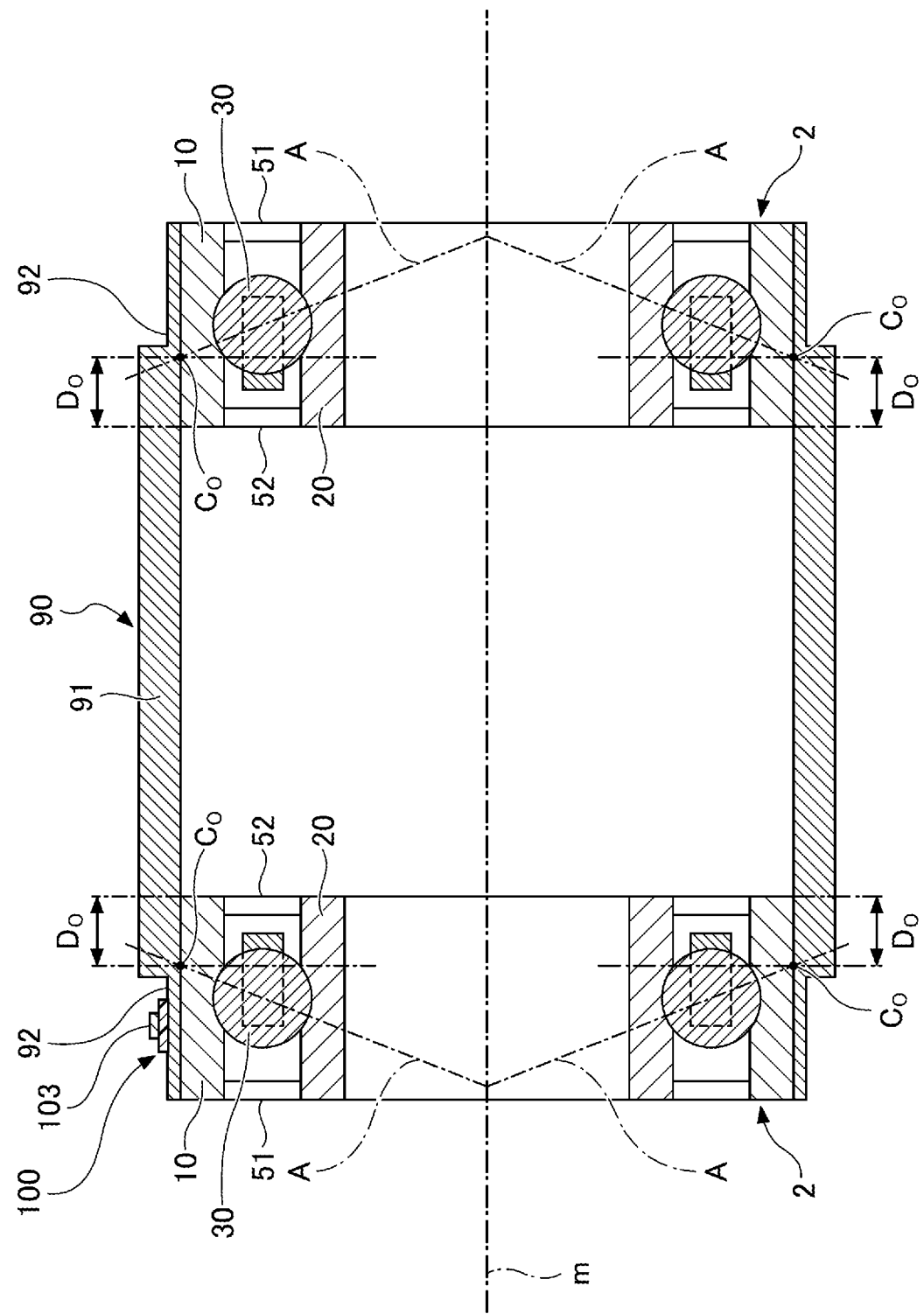
FIG. 20 is a cross-sectional view that shows an example of a rolling bearing holder unit according to a fourth embodiment (pattern 1)

FIG. 20 is a cross-sectional view that shows an example of a rolling bearing holder unit according to the fourth embodiment (pattern 1). The rolling bearing holder unit 7 shown in FIG. 20 has two rolling bearings 2, one bearing holder 90, and one strain gauge 100. However, one strain gauge 100 may be provided for each rolling bearing 2.

In the rolling bearing holder unit 7, two rolling bearings 2 are placed a predetermined gap apart such that their respective rotation axes m match, and their respective preloaded end surfaces are opposite each other. As in FIG. 5, this is a double-back (DB) preloading direction.

The bearing holder 90 has: a thick part 91; and thin parts 92 placed on both sides of the thick part 91 in the direction of the rotation axis m. The thick part 91 is placed so as to contact at least the region $D_o$ of each rolling bearing 2. The portion of the thick part 91 that contacts one rolling bearing 2 is integrated with the portion that extends toward the other rolling bearing 2 and contacts the other rolling bearing 2.

FIG. 21 is a cross-sectional view that shows an example of the rolling bearing holder unit according to the fourth embodiment (pattern 2). The rolling bearing holder unit 7A shown in FIG. 21 has two rolling bearings 2, one bearing holder 90A, and one strain gauge 100. However, one strain gauge 100 may be provided for each rolling bearing 2.

In the rolling bearing holder unit 7A, two rolling bearings 2 are placed a predetermined gap apart such that their respective rotation axes m match, and their respective preloaded end surfaces both face outward. As in FIG. 6, this is a double-front (DF) preloading direction.

The bearing holder 90A has a thin part 92A; and thick parts 91A placed on both sides of the thin part 92A in the direction of the rotation axis m. The thick parts 91A are placed so as to contact at least the region $D_o$ of each rolling bearing 2. The portion of the thin part 92A that contacts one rolling bearing 2 is integrated with the portion that extends toward the other rolling bearing 2 and contacts the other rolling bearing 2.

Thus, one bearing holder may be provided for two rolling bearings. In this case, too, the strain of the outer ring 10 can be detected via the thin part, which is a strain-transmitting part. In addition, by placing the thick parts in contact at least with the region $D_o$ of the outer circumferential surface of the outer ring 10 of each rolling bearing, the rigidity of the shaft to be inserted in the rolling bearing holder unit can be ensured. Note that the contents described in the above-described embodiments can also be applied to other embodiments and modifications as well.

Although preferred embodiments and the like have been described in detail above, the present invention is by no means limited to the above-described embodiments and the like, and various modifications and substitutions can be made to the above-described embodiments and the like without departing from the scope of the claims.

For example, the thick part and the thin part are not limited to having a cylindrical shape, and may have any shape. For example, the thick part and the thin part may have a shape with a polygonal cross-section. The thick part may employ any shape as long as it does not affect the rigidity of the shaft. Likewise, the thin part may employ any shape as long as it is thick enough to obtain the necessary output described above.

This international application is based on and claims priority to Japanese Patent Application No. 2020-131006, filed on Jul. 31, 2020, the entire contents of which are incorporated herein by reference.

REFERENCE SIGNS LIST 1, 1A-1D, 5, 5A-5D, 6, 7, 7A rolling bearing holder unit
2 rolling bearing
10 outer ring
20 inner ring
30 rolling body
40 holder
50 track
51, 52 seal
60, 60A-60D, 70, 70A-70D, 80 bearing holder
61, 61B-61D, 71, 71B-71D, 81 thick parts
61A, 72A large-diameter part
62A, 71A small-diameter part
62, 62B-62D, 72, 72B-72D, 82 thin part
100 strain gauge
101 substrate
101a upper surface
102 functional layers
103 resistor
104 wire
105 terminal part
106 cover layer

The invention claimed is:
1. A rolling bearing holder unit comprising:
at least one rolling bearing with a predetermined rotation axis, the at least one rolling bearing including:
an outer ring;
an inner ring placed inward relative to an inner circumferential surface of the outer ring to be coaxial with the outer ring; and
a plurality of rolling bodies placed between the outer ring and the inner ring;
a bearing holder placed in contact with an outer circumferential surface of the outer ring or an inner circumferential surface of the inner ring in the at least one rolling bearing; and a strain gauge with a resistor that is configured to detect a strain of the outer ring or the inner ring, wherein the bearing holder has a thick part and a thin part that is thinner than the thick part, wherein the strain gauge is placed on the thin part, wherein the at least one rolling bearing is preloaded to form a predetermined contact angle, and wherein the thick part is placed in contact at least with a region extending from an intersection of a straight line indicating the predetermined contact angle and the outer circumferential surface of the outer ring or the inner circumferential surface of the inner ring, to a preloaded end surface, the preloaded end surface being an end surface of the outer ring or the inner ring located nearer to the intersection.

2. The rolling bearing holder unit according to claim 1, wherein a length of the thick part in a direction of the predetermined rotation axis is shorter than a length of each of the outer ring and the inner ring in the direction of the predetermined rotation axis.

3. The rolling bearing holder unit according to claim 1, wherein a length of the thick part in a direction of the predetermined rotation axis is substantially equal to a length of each of the outer ring and the inner ring in the direction of the predetermined rotation axis, and wherein the thick part is placed in contact with an entire outer circumferential surface of the outer ring or an entire inner circumferential surface of the inner ring.

4. The rolling bearing holder unit according to claim 3, wherein the thin part protrudes, in a direction that is substantially parallel to the direction of the predetermined rotation axis, from a side of an end surface of the thick part located nearer to the predetermined rotation axis.

5. The rolling bearing holder unit according to claim 3, wherein the thin part protrudes, in a direction that is substantially parallel to the direction of the predetermined rotation axis, from a side of an end surface of the thick part located farther from the predetermined rotation axis.

6. The rolling bearing holder unit according to claim 3, wherein the thin part extends from an end surface of the thick part in a direction that is substantially perpendicular to the predetermined rotation axis, and is placed in contact with part of an end surface of the outer ring or the inner ring, and wherein a thickness of the thin part in the direction of the predetermined rotation axis is thinner than a thickness of the thick part in a radial direction.

7. The rolling bearing holder unit according to claim 1, wherein the thick part and the thin part are cylindrical.

8. The rolling bearing holder unit according to claim 7, wherein the bearing holder is formed by joining together separate members having different diameters.

9. The rolling bearing holder unit according to claim 1, wherein the thick part is cylindrical, and the thin part is a recessed part provided in the thick part.

10. The rolling bearing holder unit according to claim 1, wherein the at least one rolling bearing includes two rolling bearings, wherein the two rolling bearings are placed a predetermined gap apart such that respective rotation axes of the two rolling bearings are colinear and respective preloaded end surfaces of the two rolling bearings are opposite each other, wherein one bearing holder is provided for the two rolling bearings, wherein the thick part is placed in contact at least with the region of each rolling bearing, and wherein a portion of the thick part that contacts one rolling bearing is integrated with a portion that extends toward the other rolling bearing and contacts the other rolling bearing.

11. The rolling bearing holder unit according to claim 1, wherein the at least one rolling bearing includes two rolling bearings, wherein the two rolling bearings are placed a predetermined gap apart such that respective rotation axes of the two rolling bearings are colinear and respective preloaded end surfaces of the two rolling bearings both face outward, wherein one bearing holder is provided for the two rolling bearings, wherein the thick part is placed in contact at least with the region of each rolling bearing, and wherein a portion of the thin part that contacts one rolling bearing is integrated with a portion that extends toward the other rolling bearing and contacts the other rolling bearing.

12. The rolling bearing holder unit according to claim 1, wherein the resistor is made of a Cr composite film.

13. The rolling bearing holder unit according to claim 1, wherein an outer diameter of the outer ring is 30 mm or less.

* * * * *